US011123917B2

(12) United States Patent
Gardiner et al.

(10) Patent No.: US 11,123,917 B2
(45) Date of Patent: Sep. 21, 2021

(54) APPARATUS FOR FABRICATING AN OBJECT

(71) Applicant: LAING O'ROURKE AUSTRALIA PTY LIMITED, North Sydney (AU)

(72) Inventors: James Bruce Gardiner, North Sydney (AU); Nathan Graham Edward Kirchner, North Sydney (AU); Omar Al-Khayat, North Sydney (AU)

(73) Assignee: LAING O'ROURKE AUSTRALIA PTY LIMITED, North Sydney (AU)

( * ) Notice: Subject to any disclaimer, the term of this patent is extended or adjusted under 35 U.S.C. 154(b) by 296 days.

(21) Appl. No.: 16/063,401

(22) PCT Filed: Dec. 16, 2016

(86) PCT No.: PCT/AU2016/051243
§ 371 (c)(1),
(2) Date: Jun. 18, 2018

(87) PCT Pub. No.: WO2017/100853
PCT Pub. Date: Jun. 22, 2017

(65) Prior Publication Data
US 2018/0370117 A1    Dec. 27, 2018

(30) Foreign Application Priority Data

Dec. 18, 2015    (AU) .................................. 2015905265

(51) Int. Cl.
*B29C 64/112* (2017.01)
*B33Y 10/00* (2015.01)
(Continued)

(52) U.S. Cl.
CPC .......... *B29C 64/112* (2017.08); *B29C 64/106* (2017.08); *B29C 64/209* (2017.08);
(Continued)

(58) Field of Classification Search
None
See application file for complete search history.

(56) References Cited

U.S. PATENT DOCUMENTS 5,959,643 A * 9/1999 Temple .................. B41J 2/1609
347/40
5,975,493 A    11/1999 Ellingson et al.
(Continued)

FOREIGN PATENT DOCUMENTS

WO    WO-2004/065707 A2    8/2004
WO    WO-2015153400 A1    10/2015
WO    WO-2016/019435 A1    2/2016

OTHER PUBLICATIONS

Notification of Transmittal of the International Search Report and the Written Opinion of the International Searching Authority for International Application No. PCT/AU2016/051243, dated Feb. 15, 2017.

(Continued)

*Primary Examiner* — Peter L Vajda
*Assistant Examiner* — Adrianna N Konves
(74) *Attorney, Agent, or Firm* — Marshall, Gerstein & Borun LLP

(57) ABSTRACT

An apparatus for fabricating an object on a substrate, the apparatus including a plurality of nozzles arranged in an array and each nozzle being in communication with a supply of build material and configured to expel a quantity of the build material therefrom, and also including a controller configured to selectively operate each nozzle to deposit a portion of the build material, responsive to data relating to a geometry of the object. During operation, the controller selectively operates at least some of the nozzles to deposit portions of the build material in specific locations corresponding with the object geometry, wherein at least one of (Continued)

the portions abuts the substrate and the portions are progressively deposited until the portions form the object.

11 Claims, 32 Drawing Sheets

(51) Int. Cl.
    *B33Y 30/00*     (2015.01)
    *B29C 64/106*     (2017.01)
    *B29C 64/241*     (2017.01)
    *B29C 64/232*     (2017.01)
    *B29C 64/343*     (2017.01)
    *B33Y 50/02*     (2015.01)
    *B29C 64/245*     (2017.01)
    *B29C 64/209*     (2017.01)
    *B29C 64/393*     (2017.01)
    *B29C 64/40*     (2017.01)

(52) U.S. Cl.
    CPC .......... *B29C 64/232* (2017.08); *B29C 64/241* (2017.08); *B29C 64/245* (2017.08); *B29C 64/343* (2017.08); *B29C 64/393* (2017.08); *B29C 64/40* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 6,259,962 B1 | 7/2001 | Gothait | |
| 8,827,684 B1* | 9/2014 | Schumacher | B29C 64/209 425/375 |
| 2006/0160250 A1* | 7/2006 | Bonassar | A61L 27/44 438/1 |
| 2008/0186354 A1* | 8/2008 | White | G02B 5/201 347/38 |
| 2014/0210137 A1 | 7/2014 | Patterson et al. | |
| 2014/0246809 A1 | 9/2014 | Hofmann et al. | |
| 2014/0265690 A1* | 9/2014 | Henderson | B60L 15/002 310/90.5 |
| 2017/0173878 A1* | 6/2017 | Myerberg | B22F 3/1055 |

OTHER PUBLICATIONS

Examination Report issued in European Patent Application No. 16874144.5 dated Jul. 3, 2020.

* cited by examiner

APPARATUS FOR FABRICATING AN OBJECT

CROSS-REFERENCE TO RELATED APPLICATIONS

The present application claims priority from Australian Provisional Patent Application No. 2015905265 filed on 18 Dec. 2015, the contents of which are incorporated herein by reference.

TECHNICAL FIELD

The present disclosure generally relates to fabricating objects with an apparatus. In particular, the disclosure relates fabricating objects with an additive manufacturing apparatus configured to expel material in specific locations.

BACKGROUND

Additive manufacturing (commonly referred to as '3D printing') generally involves an apparatus arranging material in specific locations to fabricate a structure substantially corresponding with a defined geometry of the structure. The apparatus is typically directed by data derived from a three-dimensional ('3D') digital model of the structure to arrange the material in the specific locations. For example, fabricating the structure may involve the apparatus moving within a build volume and selectively extruding material, bonding powdered material, or solidifying liquid curable material in the specific locations. The digital 3D model is typically created by a user operating computer aided design ('CAD') software to construct a model a desired geometry, and/or an algorithm executing instructions to automatically generate geometry. The geometry and potentially other defined properties of the digital model, such as density, are then used as parameters to control operation of the apparatus to fabricate an object. Many different types of additive manufacturing processes are known and have been employed for a considerable period of time to fabricate various objects.

One common additive manufacturing process involves selective deposition of material in specific locations to form successive planar layers, commonly known as 'fused deposition modeling' (FDM) or 'fused filament fabrication' (FFF). This typically involves melting a filament of polymer material and extruding molten portions of the filament in the specific locations to form the layers. The layers typically correspond with cross-sections of the object, and therefore the object is fabricated from a plurality of bonded, planar cross-sections. Many variations of this approach are known in the relevant art and employed to fabricate a wide range of objects from many different materials. For example, this approach has been used to fabricate diverse products such as human orthopaedic prosthetics from polymers and/or metals, buildings from concrete, and edible dishes from liquefied/pasted foods.

A major drawback with known deposition-based additive manufacturing processes is the time required to fabricate the object, as it often requires a considerable length of time to deposit the material necessary to fabricate the required layers. For example, if an object is fabricated at 'high resolution' and therefore has smooth external surfaces, the apparatus may need to fabricate hundreds or thousands of very thin layers (typically having a thickness dimension of 1000 um), which requires a significant period of time. For many applications, the duration of a build cycle for the object is considered unacceptably lengthy. This is particularly the case when large-scale objects, for example, larger than 1 m$^3$, are fabricated using such additive manufacturing techniques.

A further problem with known deposition-based additive manufacturing processes is the risk of mechanical failure of the fabricated object over time. As the object is typically fabricated from many parallel, planar layers successively arranged one on top of another, there is a delay between the completion of a first layer and a second layer being fabricated on the first layer. This delay means that the first layer cools and/or at least partially sets, which can prevent the second layer from forming a strong bond to the first layer. This results in an object formed from layers joined to each other by relatively weak bonds, which can cause the layers to separate over time—commonly known as 'delamination'—causing damage to the object which degrades its aesthetic appeal and/or structure of the object.

Another issue with known deposition-based additive manufacturing apparatus is the size of objects able to be fabricated by the apparatus is limited by the size of the build volume. For example, a typical 'desktop' 3D printer has a build volume of 6,000 cubic centimetres, and therefore any object fabricated by this apparatus must fit within this volume. This, again, is particularly an issue when attempting to fabricate a large-scale object.

Accordingly, it would be advantageous to provide a method for fabricating an object with a deposition-based additive manufacturing apparatus, or the apparatus itself, which allows objects to be fabricated more quickly than prior art approaches, and/or which results in objects which are more durable than those produced by known techniques. Furthermore, it would be useful to provide such a method and/or apparatus which allows small-scale and large-scale objects to be produced.

Moreover, it would be useful to provide a solution that avoids or ameliorates any of the disadvantages present in the prior art, or which provides another alternative to the prior art approaches.

Any discussion of documents, acts, materials, devices, articles or the like included in the present specification is not to be taken as an admission that any or all of these matters form part of the common general knowledge in the field relevant to the present disclosure as it existed before the priority date of each claim of this application.

SUMMARY

According to one aspect of the disclosure there is provided an apparatus for fabricating an object on a substrate, the apparatus comprising a plurality of nozzles arranged in an array, each nozzle being in communication with a supply of build material and each nozzle configured to expel a quantity of the build material therefrom, and a controller configured to selectively operate each nozzle to deposit a portion of the build material, responsive to data relating to a geometry of the object, the controller selectively operating at least some of the nozzles to deposit portions of the build material in specific locations corresponding with the object geometry, wherein at least one of the portions abuts the substrate and the portions are progressively deposited until the portions form the object.

According to another aspect of the disclosure, there is provided a method for fabricating an object on a substrate with an apparatus arranged relative to the substrate, the apparatus having a plurality of nozzles arranged in an array, each nozzle being in communication with a supply of build material and each nozzle configured to expel a quantity of the build material therefrom, wherein at least one of the array and the substrate is movable, the method including receiving, by the apparatus, data relating to the object geometry, moving at least one of the array and the substrate relative to each other, and selectively operating at least some of the nozzles to deposit portions of the build material in specific locations corresponding with the object geometry, wherein at least one of the portions abuts the substrate and the portions are progressively deposited until the portions form the object.

Other aspects are disclosed.

BRIEF DESCRIPTION OF DRAWINGS

Preferred embodiments of the disclosed principles will now be described, by way of example only, with reference to the accompanying drawings in which:

FIG. 8 shown the apparatus fabricating a further alternative object on the surface;

FIG. 39 is a side view of a further alternative apparatus having an array suspended from a balloon and fabricating an object on a substrate.

DESCRIPTION OF EMBODIMENTS

Figure 1A:
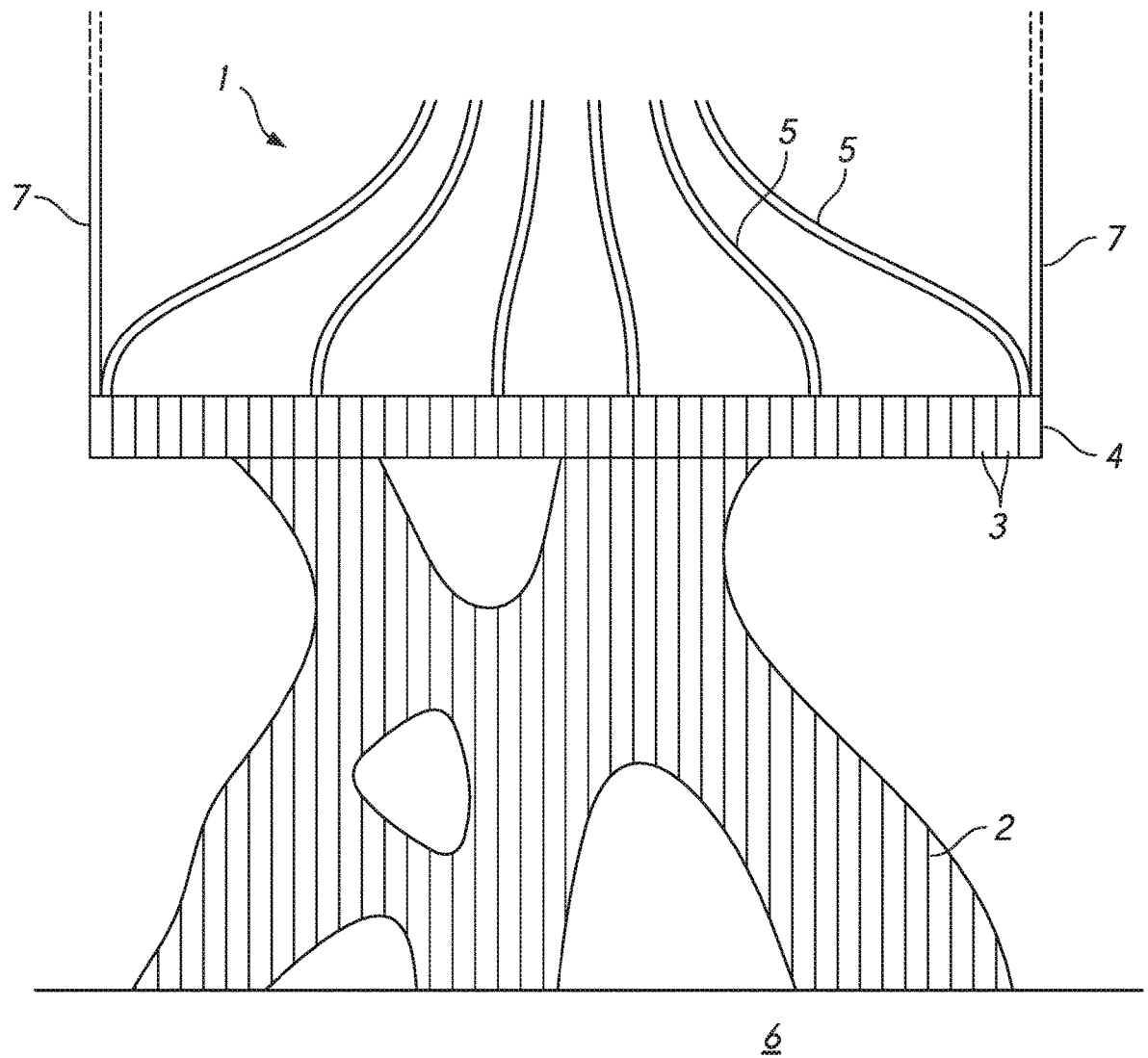
FIG. 1A is a side view of an apparatus having a nozzle array suspended above a substrate and fabricating an object on the substrate.

The present disclosure generally relates to apparatus and methods for fabricating an object on a substrate.

Some disclosed apparatus embodiments include a plurality of nozzles arranged in an array, each nozzle being in communication with a supply of build material and each nozzle configured to selectively expel a quantity of the build material therefrom, and a controller configured to selectively operate each nozzle to deposit a portion of the build material, responsive to data relating to a geometry of the object. The controller selectively operates at least some of the nozzles to deposit portions of the build material in specific locations corresponding with the object geometry so that at least one of the portions abuts the substrate, and the portions are progressively deposited until the portions form the object.

Some disclosed methods involve fabricating an object with an apparatus arranged relative to the substrate, the apparatus having a plurality of nozzles arranged in an array, each nozzle being in communication with a supply of build material and each nozzle configured to expel a quantity of the build material therefrom, wherein at least one of the array and the substrate is movable. The method includes receiving, by the apparatus, data relating to the object geometry, moving at least one of the array and the substrate relative to each other, and selectively operating at least some of the nozzles to deposit portions of the build material in specific locations corresponding with the object geometry, so that at least one of the portions abuts the substrate and the portions are progressively deposited until the portions form the object.

The disclosed principles typically involve fabricating an entire cross-section of the object simultaneously by operating each nozzle in the array arranged proximal to a location in the object geometry defined as requiring build material, thereby expelling a quantity of the build material in the defined location to fabricate the specified portion of the object. Typically a first cross-section is fabricated abutting the substrate and further cross-sections progressively fabricated. This means that if the object is fabricated by depositing successive cross-section layers, each layer can be produced in a single deposition operation and therefore the number of operations required to fabricate the object is reduced, compared to prior art approaches. Alternatively, the object may be fabricated from one 'continuous layer', whereby the apparatus continuously deposits portions of the build material in the defined locations as it is moved relative to the substrate, until portions form the object. In either scenario, this allows the object to be rapidly fabricated, advantageously reducing the duration of the fabrication process.

The array is arranged relative to the substrate and at least one of the array and the substrate progressively moves away from each other successively or concurrently with depositing the portions of the build material. This results in the portions of the build material extruded from the apparatus bonding to adjacent portions of the build material which have been extruded simultaneously and are therefore in the same state. As the portions of build material then set at substantially the same rate, this forms a substantially homogenous structure having strong bonds between the deposited portions of the build material. This advantageously avoids the problems associated with weak bonds formed between layers fabricated by a conventional layer-wise approach, such as delamination, resulting in a strong and durable object.

Typically at least one of the array and the substrate are configured to be movable, thereby allowing relative movement responsive to the object geometry, to allow the array to deposit the portions of the build material in the specific locations. For example, the array may be connected to an array translation mechanism configured to move the array relative to the substrate. The array translation mechanism may be configured as one of many different systems capable of moving the array relative to the substrate, such as a winch to elevate the array, a rotor assembly configured to lift and hover the array, or a vehicle to translate the array across a surface. Alternatively, the substrate may be movable by a substrate translation mechanism, such as the substrate being defined on a movable platform. The scope of potential configurations of the apparatus to enable relative movement of the array and substrate is useful, as this allows the configuration of the apparatus to be optimised according to usage environment and properties of the object(s) being fabricated.

The arrangement of the nozzles in the array is typically configurable according to a maximum cross-section of the object geometry. This means that potentially very large objects can be fabricated by the disclosed apparatus, as the array may be configured to be proportionally as large. In some embodiments, the array and/or nozzles are configured as modular units able to be readily connected to other like modular units, therefore enhancing the adaptability of the apparatus to fabricate large structures.

The disclosed apparatus is typically controlled by data derived from a digital, typically three-dimensional (3D), model of the object. The digital model geometry is typically defined by a user operating computer aided design ('CAD') software and/or an algorithm automatically generating the geometry. This may also involve the user/algorithm defining other properties of the object which would affect the operation of the apparatus, such as different materials which specific portions of the object are formed from thereby affecting the build material supplied to and expelled from one or more of the nozzles, and/or strength requirements of specific portions of the object, thereby affecting operation of the nozzles, such as adjusting a position, orientation and/or orifice properties of one or more of the nozzles. The digital model is then typically converted into computer instructions to direct operation of the apparatus. It will be appreciated that this method of generating the data for directing operation of the apparatus is only one typical example and other methods are within the scope of this disclosure. For example, the digital model may not be defined prior to operation of the apparatus and instead, the digital model geometry be defined by an algorithm executed simultaneously with operation of the apparatus, thereby defining the object geometry dynamically responsive to other criteria, for example, responsive to sensor measurements.

The data derived from the digital object model directs the apparatus to deposit portions of the build material in specific locations corresponding with the defined object geometry to fabricate the object. The data may also direct the apparatus to affect other properties of the object, such as depositing different materials in specific locations, or selectively removing build material from specific locations.

The term 'deposition' is used throughout this specification and will be appreciated to encompass all known additive manufacturing methods of expelling a build material from an apparatus. For example, it will be appreciated extruding, jetting and spraying build material are all within the scope of 'depositing'.

FIG. 1A shows a side view of a computer-controlled apparatus 1 fabricating an object 2. The apparatus 1 comprises a plurality of nozzles 3 arranged in an array 4, the array 4 suspended above a substrate 6 by cables 7. Each nozzle 3 is in communication with a supply of settable build material and configured to selectively expel a quantity of the build material when operated, thereby depositing a portion of the build material. In the embodiment shown in FIG. 1A, the build material is conveyed to the nozzles 3 in a liquid form from a remote reservoir (not shown) via one or more hoses 5. However, it will be appreciated the build material may be supplied by a range of mechanisms, such as unwinding a reel of meltable filament (not illustrated), or by grinding and melting granules of material received from a master hopper containing the granules (not illustrated). The apparatus 1 further includes an array translation mechanism for moving the array 4 typically relative to the substrate 6, the array translation mechanism in the embodiment shown in FIG. 1A being in the form of the cables 7 connected between the array 4 and a winch (not shown) secured in an elevated position, for example, as part of a crane structure. The apparatus 1 further includes a controller (not shown) configured to operate the array translation mechanism and selectively operate each nozzle 3 responsive to data relating to the object 2 geometry. The array 4 of nozzles 3 is arranged above the substrate 6 to define a separation distance between the substrate 6 and the array 4. The separation distance is adjustable by operating the winch, thereby elevating the array 4 relative to the substrate 6.

The array 4 may include virtually any number of nozzles 3 and arrangement thereof in the array 4, depending on the object 2 geometry. For example, for a very simple block-like object geometry, only sixteen nozzles 3 are arranged in a four-by-four grid (not shown) co-planar with each other, thereby forming a planar array 4 with each nozzle 3 arranged on a common plane. Alternatively, for a complex, double-curved geometry having smooth surfaces, hundreds or thousands of the nozzles 3 may be arranged in another configuration, such as concentric circles (not shown) and be translatable relative to a plane defined by the array 4. Typically, the apparatus 1 includes in the order of hundreds to thousands of nozzles 3 to allow finely detailed objects to be fabricated.

The object 2 is shown partially fabricated by the apparatus 1. This has involved the apparatus 1 initially arranging the array 4 adjacent the substrate 6 and then operating at least one of the nozzles 3 to expel a quantity of the build material therefrom to abut the substrate 6, thereby simultaneously fabricating an entire cross-section of the object 2. The selection of which of the nozzles 3 to operate is determined by the object geometry, as a nozzle 3 is only operated when arranged immediately proximal to a location defined by the object geometry as requiring build material. The apparatus 1 then, successively or concurrently, moves the array 4 relative to the substrate 6, in the example shown, being vertically upwards, away from the substrate 6 and continues to selectively operate at least some of the nozzles 3 to expel portions of the build material. This process may be executed in stages to fabricate the object 2 from successively expelled layers, or executed continuously, whereby the array 4 is translated relative to the substrate 6 simultaneously with the nozzles 3 being operated, to fabricate the object 2 from a single layer. As the array 4 is moved relative to the substrate 6, it is typical for many nozzles 3 to be rapidly selectively operated to expel the build material in the specific locations corresponding with the object geometry, therefore progressively depositing portions of the build material to form the object 2.

The build material is settable and therefore sets (hardens) after being deposited by the apparatus 1. Setting may involve curing or solidifying depending on the build material composition. For example, a concrete build material cures over time whereas a liquid wax build material solidifies when cooled. Typically, the build material is configured to rapidly set after deposition to enhance the efficiency of the fabrication process and potentially allow unsupported beads of material to be fabricated. For example, in the embodiment shown in FIG. 1A, the build material is expelled from the nozzles 3 to form vertically arranged beads, some of which may not be supported by an adjacent bead. In this scenario, the build material and/or apparatus 1 is configured to rapidly set the build material to allow an unsupported vertically arranged bead to be formed. It will be appreciated that this can be achieved in a number of known ways, for example, each nozzle 3 may be in communication with a cooled gas (not illustrated) and configured to spray a volume of the gas on deposited build material to accelerate setting of the build material, or alternatively the build material be deposited in a climate controlled environment and therefore be surrounded by a fluid configured to accelerate setting, such as a cooled gas, one deposited from the apparatus 1. Alternatively, the build material may comprise two component materials which are mixed in the nozzle 3 immediately prior to deposition, causing a chemical reaction which rapidly hardens the combined materials. Furthermore, the build material may contain fibres, or such fibres are mixed into the build material by the apparatus 1 when required, to enhance the structure of the deposited portions of the build material.

Following portions of the build material being deposited by the apparatus 1, the portions bond to any adjacent portions of deposited build material. As adjacent portions are expelled from the nozzles 3 at the same time, and typically at the same rate, the build material is generally in the same state, for example, the same viscosity and/or temperature, which assists adjacent, portions of the build material to form a strong bond with each other. When the apparatus 1 is operated continuously as described above, the object 2 is fabricated from a single, continuous 'layer' of build material formed from the bonded portions of build material.

To enlarge a build area of the apparatus 1, being the area in which the apparatus 1 can deposit the build material to fabricate the object 2, additional arrays 4 of nozzles 3 may be installed to the apparatus 1. The arrays 4 may be configured to be modular, allowing connection with other, like modular arrays 4 to seamlessly increase the build area. For example, when the apparatus 1 is required to fabricate object geometry measuring slightly less than 1×1×1 m, only a single 1 m$^2$ array 4 is required. Alternatively, when the apparatus 1 is required to fabricate object geometry measuring slightly less than 10×10×3 m, a grid of one hundred 1 m$^2$ arrays 4 is required. Regardless of how many arrays 4 are installed, the controller is configured to coordinate and control selective operation of any nozzle 3 in any array 4.

Figure 1B:
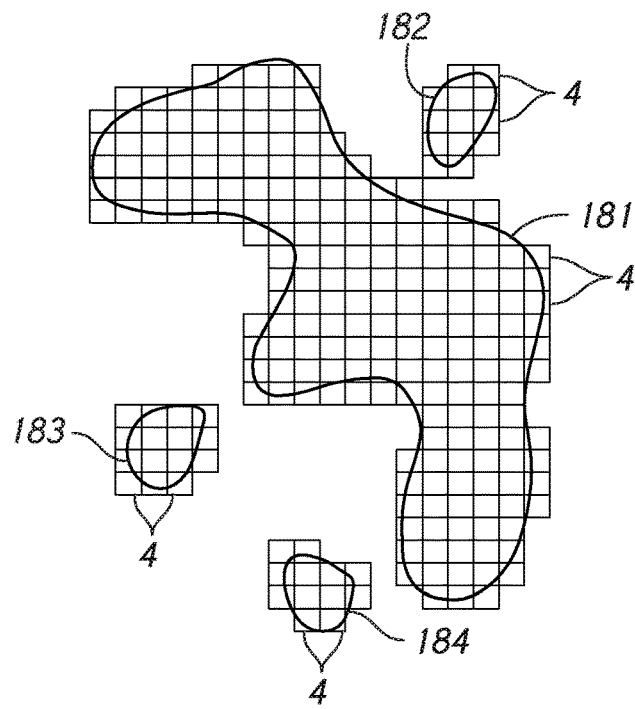
FIGS. 1B and 1C are top views of alternative configurations of the apparatus shown in FIG. 1A fabricating two alternative objects.

FIG. 1B shows a top view of an alternative configuration of the apparatus 1 having a plurality of the arrays 4 arranged to fabricate a geometry of an alternative object comprising a number of discrete portions 181, 182, 183, 184. The apparatus is configured having the plurality of arrays 4 installed in appropriate locations to fabricate the portions 181, 182, 183, 184. This allows the configuration of the apparatus 1 to be optimised to provide the minimum number of arrays 4 necessary to fabricate the portions 181, 182, 183, 184, optimising complexity of the apparatus 1 and installation time.

Figure 1C:
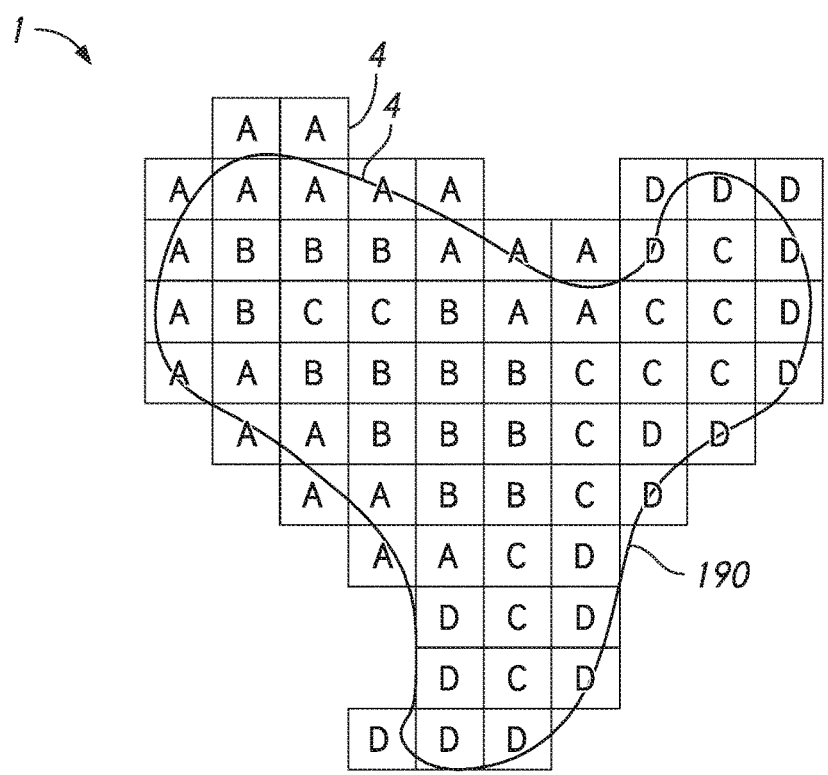

FIG. 1C shows a top view of a further alternative configuration of the apparatus 1 having a plurality of different arrays 4 arranged to fabricate a geometry of a further alternative object 190. The object 190 comprises a number of different portions comprising different build materials, such as cement, foam and cellulose, indicated by the sections labelled A-D. The apparatus 4 is in communication with a supply of each of these build materials and each array 4 configured to expel the necessary build material(s). Arrays 4 labelled 'A' are configured to deposit only cement, arrays 4 labelled 'B' are configured to deposit cement and foam, arrays 4 labelled 'C' are configured to deposit cellulose and foam, and arrays 4 labelled 'D' are configured to deposit only cellulose. Configuring the apparatus 1 in this way, optimises the complexity and cost of the apparatus 1, as simpler and less expensive arrays 4 are used where appropriate.

Figure 2:
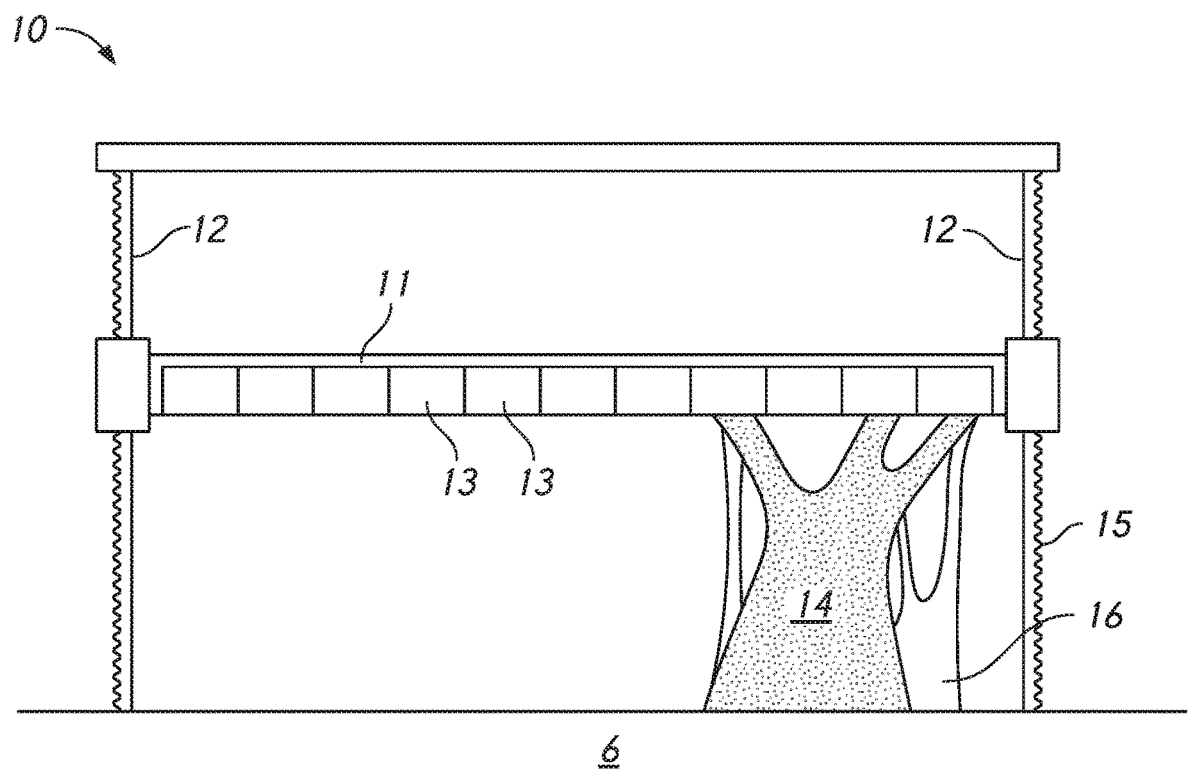
FIG. 2 is a side view of an alternative apparatus having a nozzle array coupled to a support frame secured relative to a substrate and fabricating a further alternative object on the substrate.

FIG. 2 shows an alternative apparatus 10 which shares some of the features of the apparatus 1 shown in FIG. 1, and whereby common reference numerals refer to common features. The apparatus 10 includes an alternative array translation mechanism comprising an array frame 11, configured to receive arrays 4, which is movable relative to a framework erected across the substrate 6. For example, a drive mechanism (not shown) may be coupled between the array frame 11 and a rack gear 15 arranged along one or more legs 12. The legs 12 abut the substrate 6 and support the array frame 11 thereabove. The array frame 11 defines a plurality of array ports 13 configured to retain a respective plurality of arrays 4. The array frame 11 typically positions arrays 4 retained therein to be co-planar with each other, thereby arranging the associated nozzles 3 on a common plane. The array frame 11 may also be connected to the supply of build material (not shown) and communicate the material to each array 4 installed in the frame 11. An object 14 is shown partially fabricated by the apparatus 10 below the array frame 11. The object 14 has been fabricated in the same way as the object 2 shown in FIG. 1, whereby the frame 11 is progressively moved upwards, away from the substrate 6, successively or concurrently with at least some of the nozzles 3 being selectively operated to expel a quantity of the build material therefrom, until the deposited portions of the build material form the object 14.

The apparatus 10 also includes a supply of support material (not shown) in communication with at least some of the nozzles 3. This therefore allows the apparatus 10 to also fabricate a support structure 16, comprising support material, to support portions of the object 14 which are vulnerable to deformation whilst curing due to gravity. The support structure 16 is typically removed after the object 14 has been fabricated, for example, by melting or dissolving the support material (not illustrated), or by mechanical removal means, such as milling (not illustrated).

Figure 3:
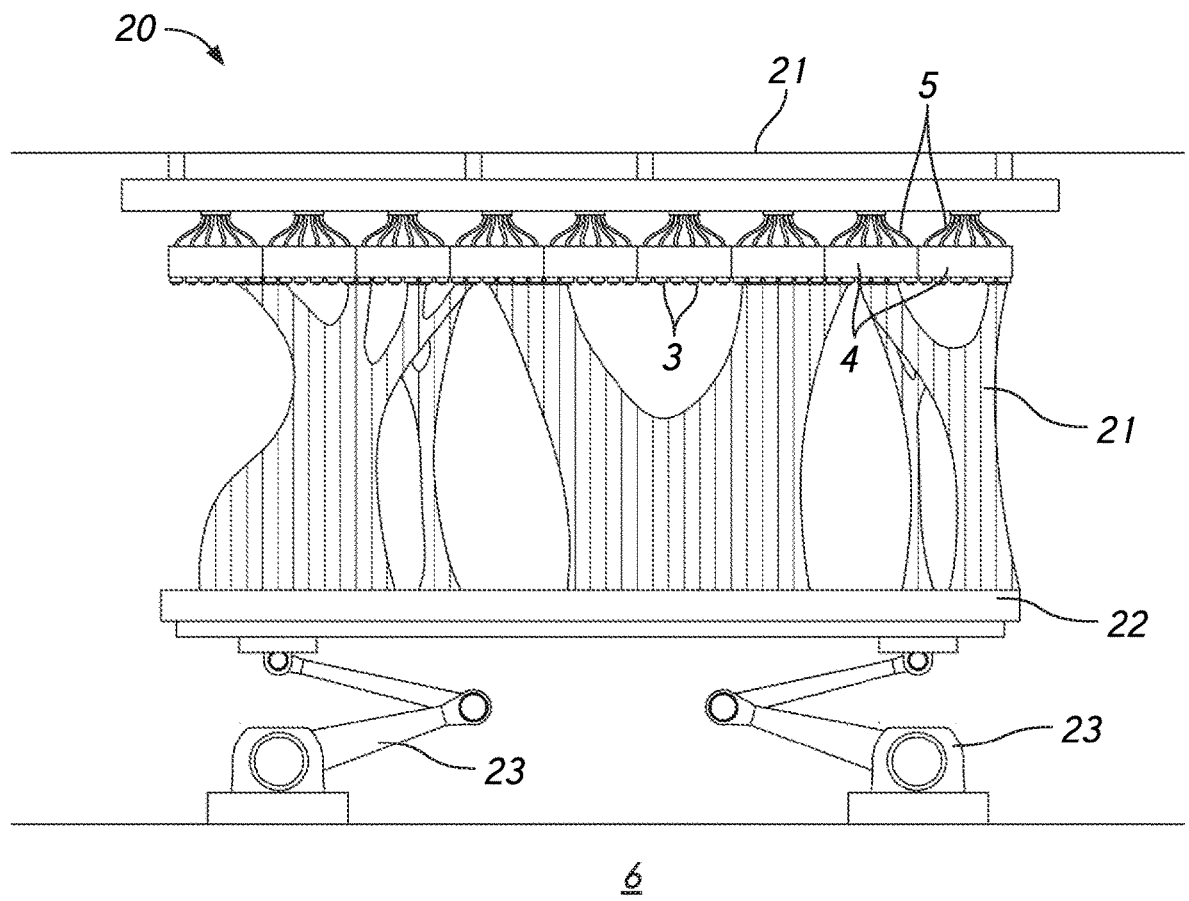
FIG. 3 is a side view of a further alternative apparatus having a nozzle array secured in a fixed position and fabricating a further alternative object on a movable substrate.

FIG. 3 shows an alternative apparatus 20 which shares some of the features of the apparatus 1, 10 shown in the previous figures, whereby common reference numerals refer to common features. The apparatus 20 is configured so that the array frame 11 is static, for example, by securing the array frame 11 to a structure, in the form of a ceiling 21 in FIG. 3. The array frame 11 houses a plurality of the arrays 4, each array 4 including a plurality of nozzles 3 in communication with the supply of build material via a plurality of hoses 5. The apparatus 20 further comprises a movable substrate 6, in the form of a platform 22 in FIG. 3, shown arranged below the array frame 11. The platform 22 is movable relative to the frame 11, and typically also rotatable about at least one axis, by the controller operating a platform translation mechanism, in the form of robotic arms 23 in FIG. 3, responsive to the object geometry. It will be appreciated that the translation mechanism may alternatively include only a single robotic arm 23 (embodiment not shown) therefore allowing the platform 22 to rotate about an axis arranged perpendicular to the array frame 11.

An object 24 is shown partially fabricated by the apparatus 20. This has involved initially arranging the platform 22 proximally below the array frame 11 and then operating at least one nozzle 3 to expel a quantity of the build material therefrom and abut the substrate 6, responsive to the object geometry. The platform 22 is then progressively moved away from the array frame 11 whilst, successively or concurrently, selectively operating at least some of the nozzles 3 to deposit portions of the build material corresponding with locations defined by the object geometry. As described above, each nozzle 3 is selectively operated when a portion of the build material is required proximally therebelow in a specific location corresponding with a defined portion of the object geometry. The manoeuvrability of the platform 22 allows the apparatus 20 to fabricate complex object geometries, as the platform 22 allows the substrate 6 and therefore the deposited build material supported thereon to be tilted/rotated relative to the arrays 4. Where the platform 22 is rotatable about an axis arranged perpendicular to the array frame 11, this allows the portions of the build material to be deposited simultaneously with the platform 22 moving away from the frame 11 and rotating, therefore allowing spiraling or helically-arranged build material to be fabricated. This can be particularly useful for fabricating a column-like object (not shown) comprising helical beads of the build material.

Figure 4A:
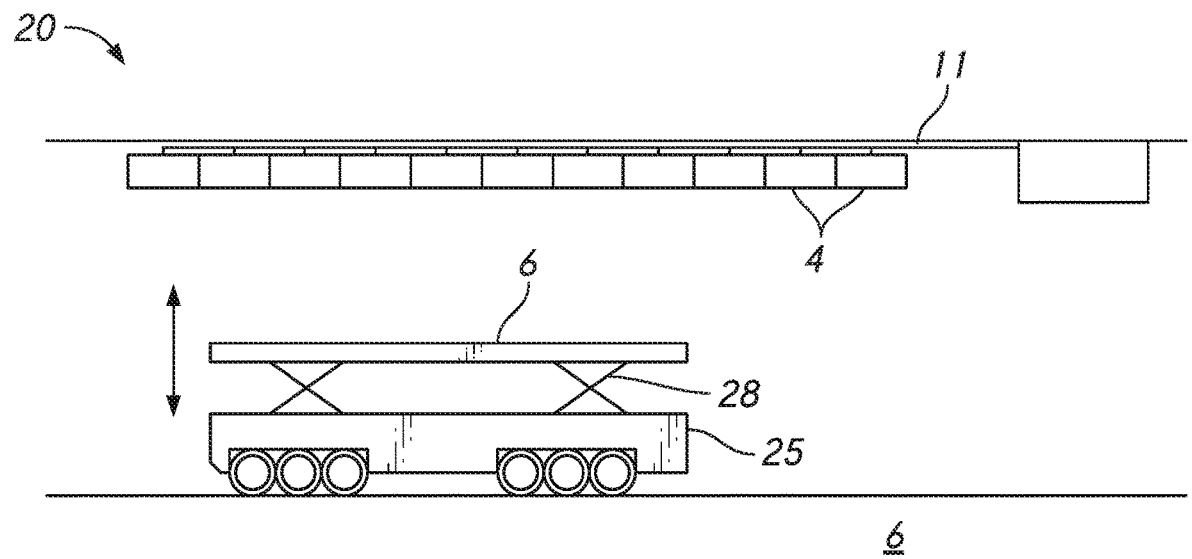
FIGS. 4A and 4B are side views of alternative configurations of the apparatus shown in FIG. 3.
Figure 4B:
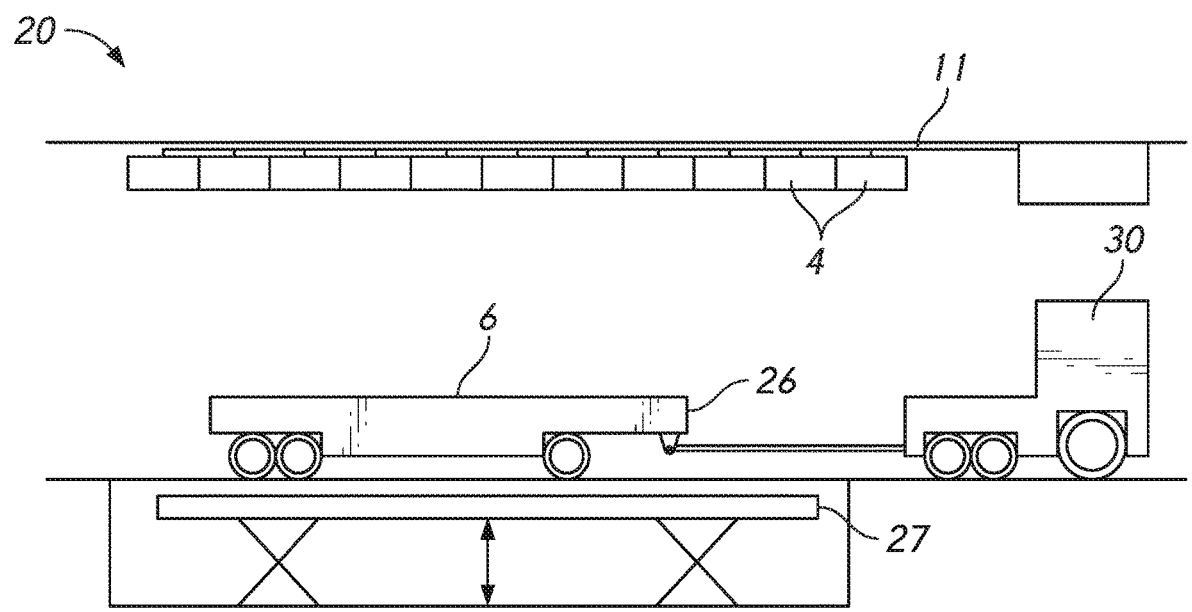

FIGS. 4A and 4B show alternative configurations of the apparatus 20, where the platform 22 is substituted with a mobile platform 25 or a vehicle trailer 26 arranged on an lifting platform 27. In FIG. 4A, the mobile platform 25 includes the substrate 6 connected to a lifting mechanism 28, in the form of hydraulic jacks, configured to elevate the substrate 6. The mobile platform 25 is configured to move along a surface, typically configured as a self-driving vehicle which are known in the art, for example, the Kuka Robotics "Omnimove" mobility platform. In FIG. 4B, the trailer 26 is a conventional semi-trailer for a truck 30 defining the substrate 6. The trailer 26 is elevated towards and away from the frame 11 by a lifting mechanism 27, in the form of hydraulic jacks. The embodiments shown in FIGS. 4A and 4B are particularly useful when large-scale objects are fabricated by the apparatus 20, as these allow the object supported thereon to be readily moved, for example, to an environment optimised to assist curing, or to a site for installation to a building.

The previous figures show two different approaches for fabricating an object with a plurality of the nozzles 3 arranged in one or more arrays 4. It will be appreciated an alternative approach is within the scope of this disclosure which involves a combination of these approaches, whereby the one or more arrays 4 and the substrate 6 are movable relative to each other (not illustrated). This results in a more complex apparatus which is suitable for particularly complex object geometries.

Figure 5:
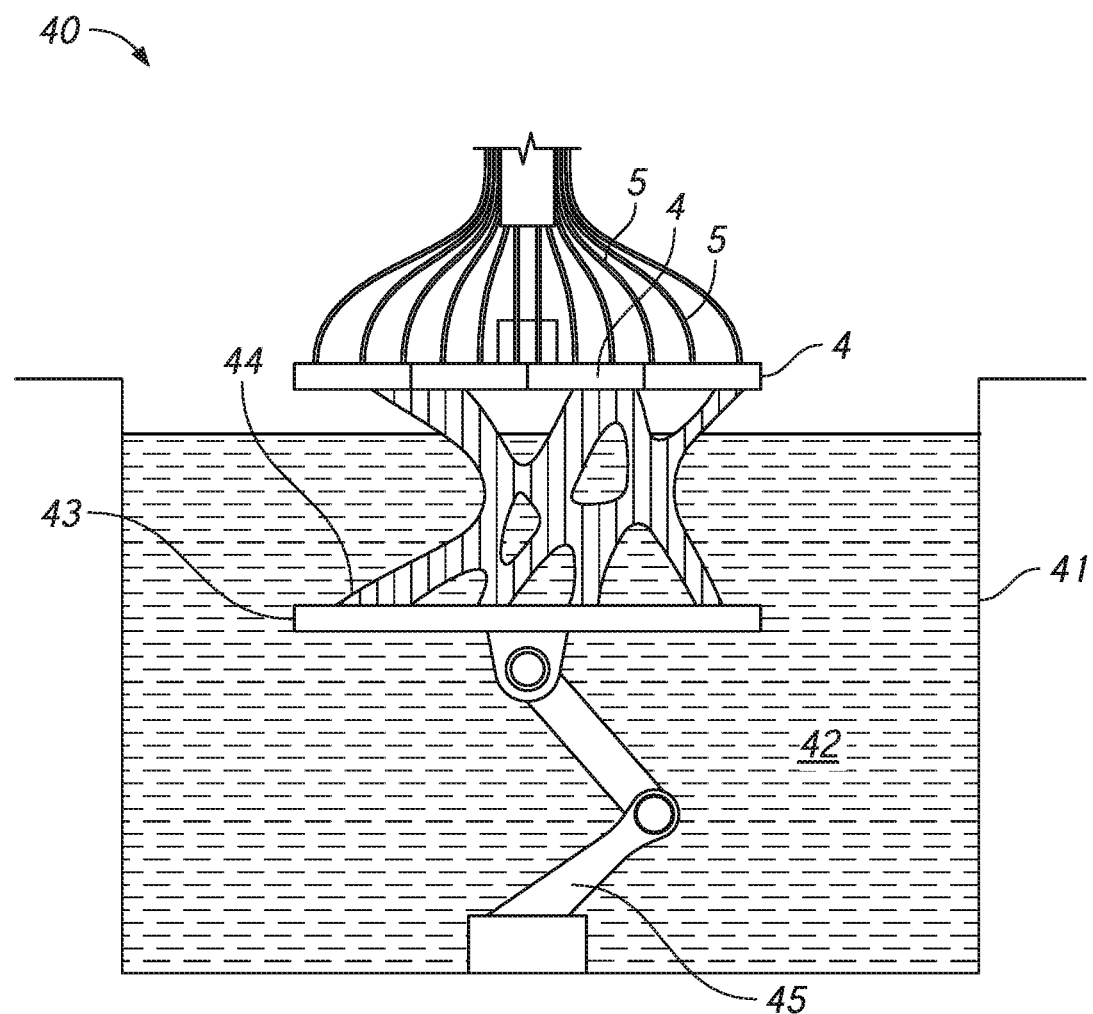
FIG. 5 is a side view of a further alternative apparatus having a nozzle array arranged relative to a reservoir containing fluid-like material and fabricating a further alternative object on a movable substrate arranged in the reservoir.

FIG. 5 shows an alternative apparatus 40 sharing some of the features of the apparatus 1 shown in FIG. 1, whereby common reference numerals refer to common features. The apparatus 40 comprises four arrays 4 each housing a plurality of the nozzles 3, each nozzle 3 being in communication with the supply of build material via hoses 5. The arrays 4 are arranged relative to a reservoir 41 containing fluid-like material 42. The fluid-like material 42 may be configured as a liquid or a granulated material. The apparatus 40 also includes a platform 43 defining the substrate 6, the platform being arranged in the reservoir 41. The platform 43 is movable and typically also be rotatable about at least one axis relative to the arrays 4 by a platform translation mechanism, in the form of a robotic arm 45 in FIG. 5.

An object 44 is shown partially fabricated by the apparatus 40. This has involved the same process as fabricating the object 24 shown in FIG. 3. Additionally, as the platform 43 is progressively lowered into the reservoir 44, the fluid-like material 42 flows around the deposited build material to support the build material, for example, to prevent deformation due to gravity whilst setting. The fluid-like material 42 may also be configured to modify properties of the build material, for example, the fluid-like material 42 may contain catalysts configured to accelerate setting of the build material, and/or may be climate controlled, for example, to apply or extract heat energy from the build material to accelerate setting the build material.

Figure 6:
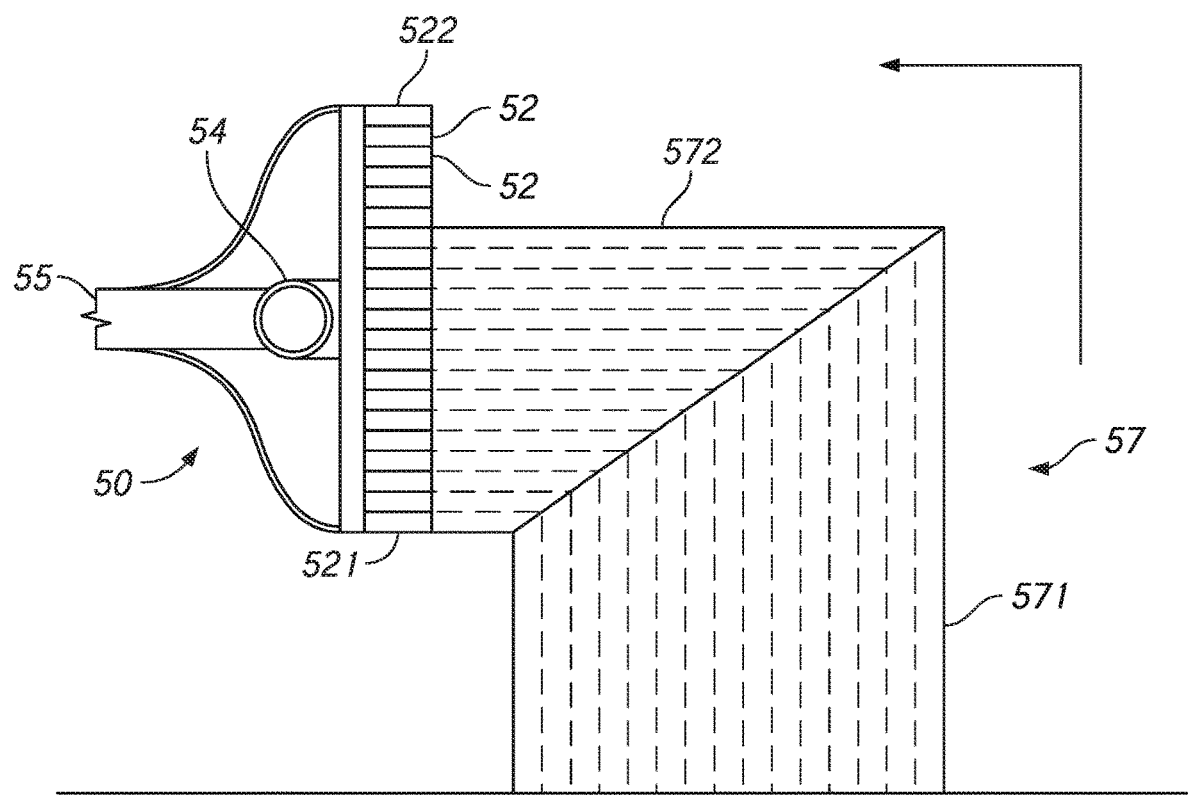
FIG. 6 is a side view of a further alternative apparatus having a rotatable and movable nozzle array and fabricating a further alternative object on a substrate.

FIG. 6 shows a further alternative apparatus 50 sharing some of the features of the apparatus 1 shown in FIG. 1, whereby common reference numerals refer to common features. The apparatus 50 includes a movable arm 55 defining an axis 54 around which the array 4 is rotatable. The controller is further configured to move and rotate the array 4, responsive to the object geometry. Typically, the arm 55 forms part of a six axis industrial robotic arm (not shown) which moves and rotates the array 4 freely through three dimensional space.

The apparatus 50 is installed relative to a substrate 56. An object 57 is shown partially fabricated by the apparatus 50, the object 57 comprising a vertical portion 571 and a horizontal portion 572. The object 57 has been fabricated by initially arranging the array 51 proximally above a substrate 56 and operating some of the nozzles 3 to expel portions of the build material therefrom. The array 51 is then moved, by the arm 55, vertically away from the substrate 56 whilst simultaneously selectively operating some of the nozzles 52 to deposit portions of the build material in specific locations corresponding the object geometry, thereby forming the vertical portion 571. The array 51 is then rotated about the axis 54 to form an equivalent angle to a top surface of the vertical portion 571 and arranged adjacent to the top surface. The array 51 is then moved, by the arm 55, horizontally away from the top surface whilst selectively operating some of the nozzles 52 to deposit further portions of the build material in specific locations corresponding with the object geometry, thereby forming the horizontal portion 572.

Alternatively, the object 57 may be fabricated by continuously operating the apparatus 50, whereby the array 51 is gradually rotated to a 45 degree angle relative to the substrate 56 whilst fabricating the vertical portion 571, and then moved horizontally to fabricate the horizontal portion 572 whilst continuing to gradually rotate the array 51 until the array is rotated to a 90 degree angle relative to the substrate 56. In this scenario, the rate of build material being expelled by the nozzles 3 is varied proportionally to the tilt of the array 51 and a position of the nozzle 3 in the array 51. For example, the expulsion rate of nozzles 521 arranged proximal to one side of the array 51 is progressively decreased during rotation of the array 51, whilst the expulsion rate of the nozzles 522 arranged proximal to an opposite side of the array 51, which travel a greater distance than the oppositely arranged nozzles 521, is progressively increased.

Figure 7:
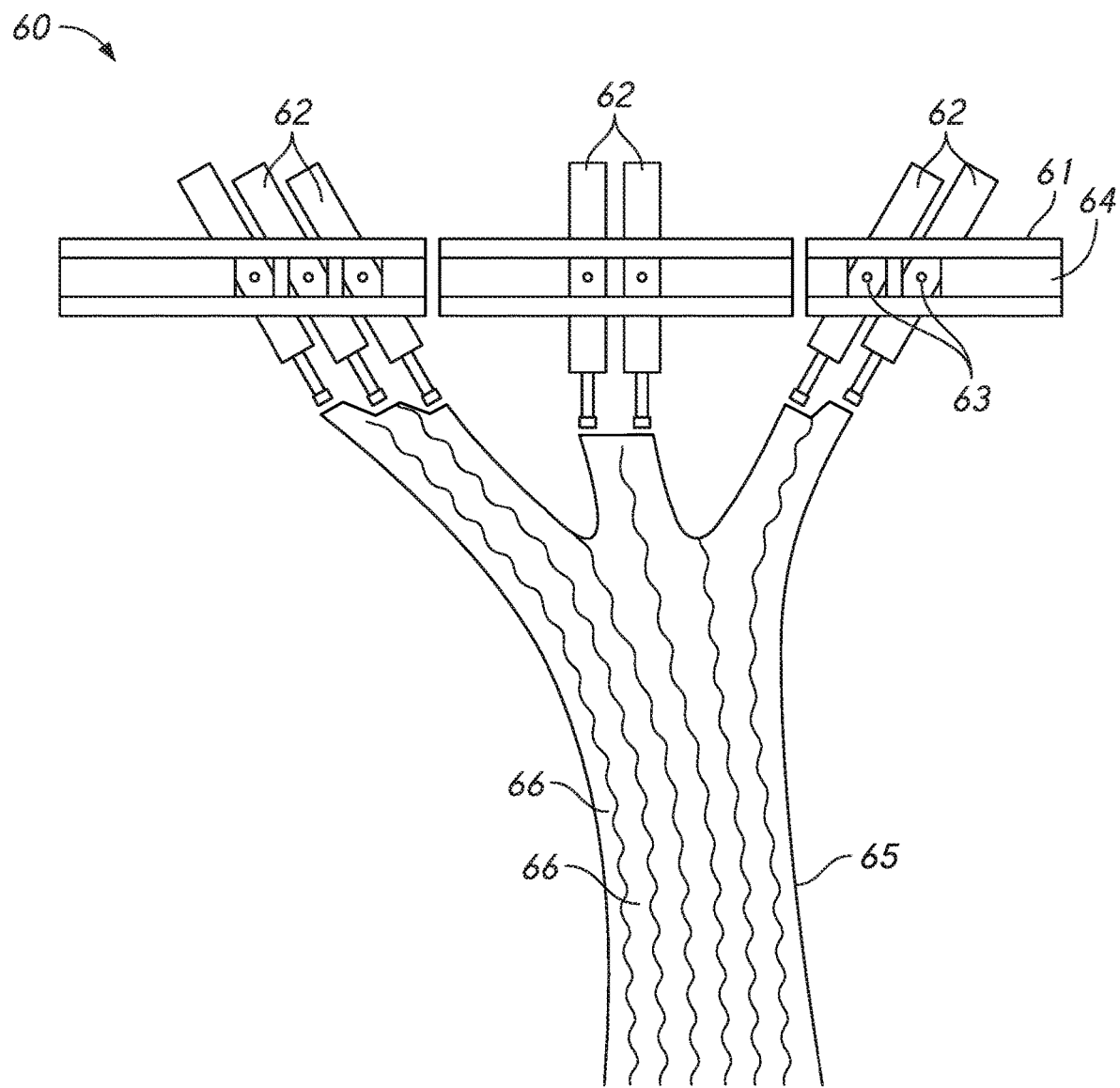
FIG. 7 is a side view of a further alternative apparatus having nozzles which are rotatable and movable within an array and fabricating a further alternative object.

FIG. 7 shows a further alternative apparatus 60 comprising three modular arrays 61 connected to each other, each array 61 including a plurality of nozzles 62. Each nozzle 62 is in communication with a supply of settable build material, and configured to expel a quantity of the material therefrom, and is pivotally connected to the associated array 61 about an axle 63 which is slidable along a track 64 in the array 61. This arrangement allows each nozzle 62 to be moved and rotated relative to the associated array 61, and also, as the tracks 64 are aligned, moved between arrays 61.

An object 65 is shown partially fabricated by the apparatus 60. This has involved moving all of the arrays 61 in a single direction and simultaneously operating the nozzles 62 to expel portions of the build material therefrom in specific locations corresponding with the object geometry. During this operation, at least some of the nozzles 62 translate across the arrays 61 and oscillate about the respective axes 63 causing the deposited portions of build material to form undulating geometry, shown as undulating beads 66. This undulating geometry is useful as this increases the surface area of each bead 66 in contact with an adjacent bead 66, and therefore enhances the strength of the bond between the beads 66.

Figure 8:
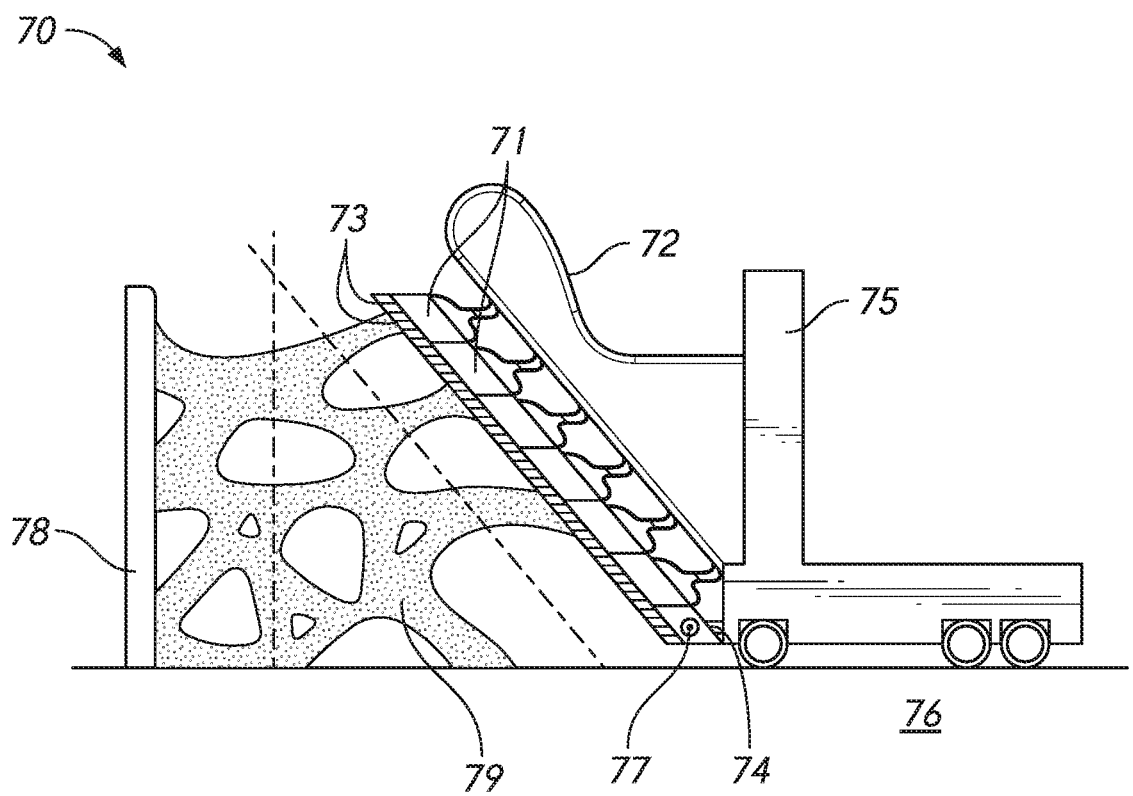
FIGS. 8 to 9D are side views of a further alternative apparatus having a nozzle array secured to a vehicle configured for movement across a surface.
Figure 9A:
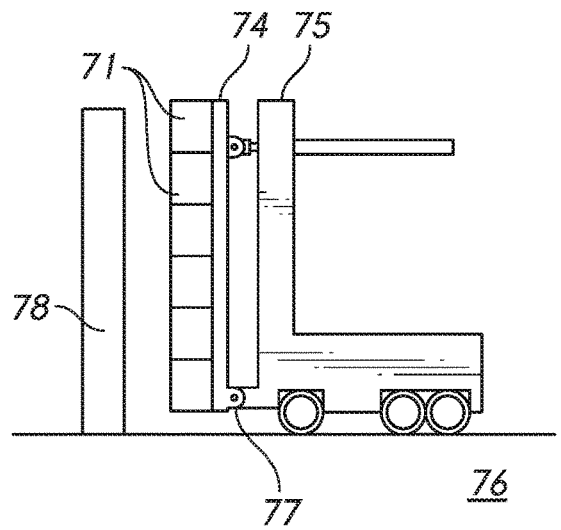
Figure 9B:
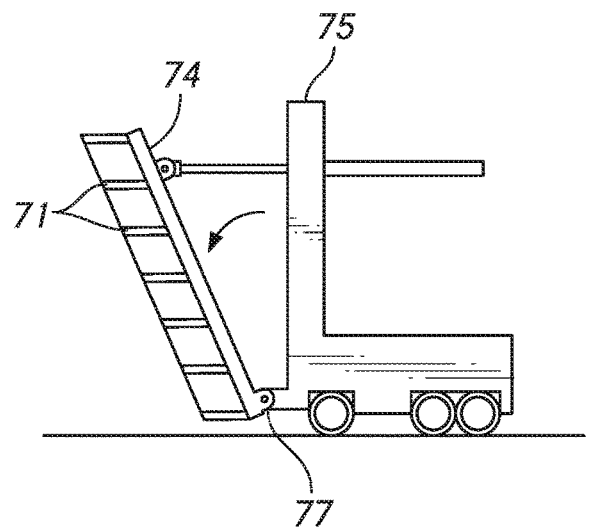
Figure 9C:
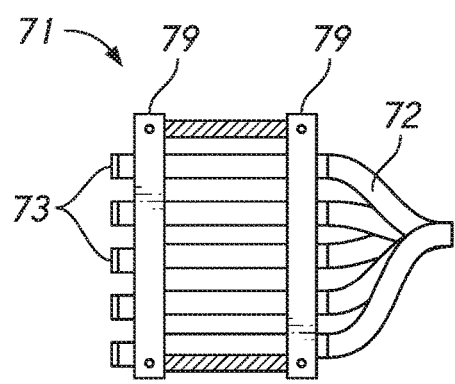
Figure 9D:
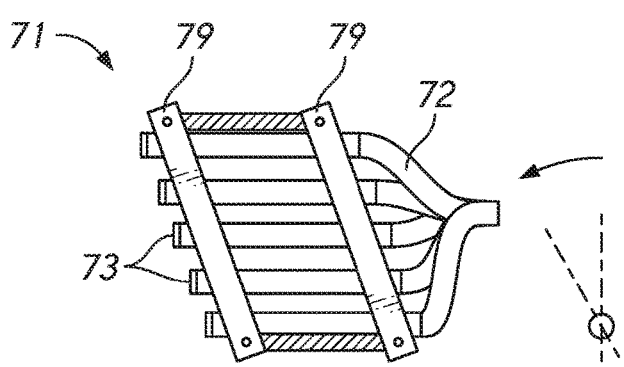

FIGS. 8 to 9D show a further alternative apparatus 70 comprising a plurality of arrays 71, each array 71 including a plurality of nozzles 73 in communication with a supply of build material via hoses 72, and each nozzle 73 configured to expel a quantity of the build material therefrom. As best shown in FIGS. 9C and 9D, each nozzle 73 may be pivotable relative to the associated array 71, for example, about pivots formed between linkages 79. The arrays 71 are connected to an alternative array translation mechanism, in the form of an array frame 74 connected to a vehicle 75 which is configured to move across a substrate 76, in the embodiment shown in the figures, by driving wheels across a surface. The array frame 74 is typically pivotable about an axis 77 arranged parallel to the substrate 76 and therefore can be pivoted towards and away from the substrate 76. It will be appreciated that the array frame 74 may alternatively be securely fixed to the mobile vehicle 75. Optionally, a support surface 78 is arranged extending transversely from the substrate 76.

In FIG. 8, an object 79 is shown partially fabricated by the apparatus 70. This has involved initially arranging the array frame 74 substantially perpendicular to the substrate 76 and selectively operating some of the nozzles 73 to fabricate an end face of the object 79, responsive to the object geometry data. Where the support surface 78 is installed, this may involve adhering the end face of the object 79 to the support surface 78. The vehicle 75 then moves across the substrate 76 successively or concurrently with some of the nozzles 73 being selectively operated to expel the building material in specific locations corresponding with the object geometry. This typically also involves progressively pivoting the array frame 74 towards the substrate 76 and generally also simultaneously rotating the nozzles 73 to maintain orientation of the nozzles 74 relative to the substrate 76 to maintain a direction the build material is being expelled from the nozzles 73. Furthermore, the apparatus 70 also typically adjusts a rate of build material being expelled from each nozzle 73 in proportion to a tilt angle of the array frame 74 and location of the nozzle 73 in the frame 74. The tilting of the frame 74 in this way allows the apparatus 70 to initially fabricate a base portion of the object 79 on the substrate 76 which begins to set immediately after being deposited. The base portion then provides a foundation for subsequently deposited build material. Tilting the frame 74 during the fabrication process provides a delay between fabricating the base portion of the object 79 and a top portion of the object 79, which is useful as the base portion is at least partially solidified before fabrication of the top portion commences and therefore the base portion supports the top portion during fabrication.

Figure 10:
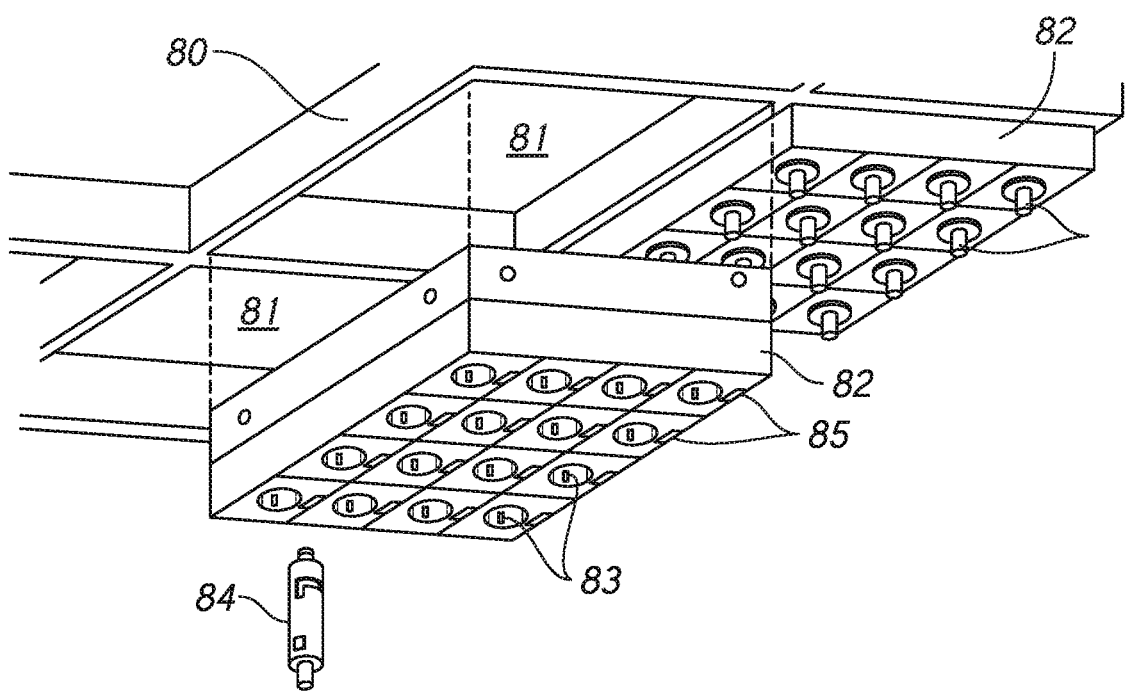
FIG. 10 is a perspective detailed view of an array frame and modular array unit.

FIG. 10 shows a detail view of an array frame 80 which may form part of any of the previously disclosed apparatus. The array frame 80 defines a plurality of apertures 81 configured to receive and releasably retain a plurality of modular array units 82. Each array module 82 defines a plurality of nozzle ports 83 configured to receive and retain a plurality of modular nozzle units 84. The array frame 80 is typically configured to arrange the array modules 82 as a planar panel, with the ports 83 arranged to position all of the nozzles 84 on a common plane. However, it will be appreciated that arrangement of nozzle ports 83 and associated nozzles 84 may be configured in other ways, typically depending on the geometry of the object the apparatus is configured to fabricate.

The nozzle ports 83 and nozzles 84 are configured to be rapidly connected, optimise installation of the nozzles 84 into the arrays 82 according to the requirements of an object geometry. For example, the nozzles 84 may connect to the ports 83 with 'snap-lock' cooperating features thereby enabling a push-fit connection able to be actuated by manual or automated means.

In some embodiments, a range of different nozzle modules 84 may be provided whereby each different type of module is configured for a different purpose, for example, expelling a specific build material. In this scenario, prior to manual installation of the nozzles 84 in the arrays 82, an algorithm may assess the digital model of the object and determine a relevant nozzle 84 to be installed in each port 83 in order to fabricate the object. For example, the algorithm may determine three different nozzles 84 are required and activate an indicator adjacent each port 83 to indicate the type of nozzle 84 which should be installed by a user.

The nozzle ports 83 and nozzles 84 typically have electronic identification means secured thereto to allow an apparatus operating the array 82 to identify a nozzle 84 in a port 83. For example, each nozzle 84 may include an RFID tag detailing an IP address and each port 83 have an RFID reader associated therewith, thereby allowing the apparatus to determine the type of nozzle 84 installed in each port 83. This is particularly useful where a variety of different nozzles 84 are installed in the array 82. For example, some nozzles 84 may be configured to expel a plurality of build materials, whereas other nozzles 84 are configured to expel a single build material. When these two different types of nozzles 84 are installed in the array 82 the identification means allows the apparatus to confirm successful installation of the nozzles 84 in the ports 83 and supply the necessary build material(s) to each nozzle 84.

Figure 11A:
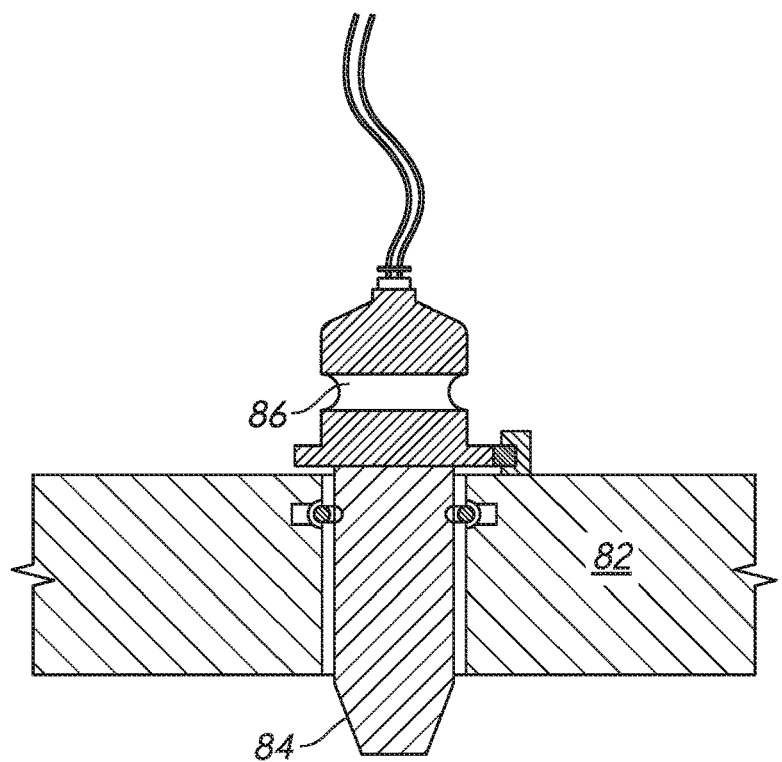
FIGS. 11A and 11B are cross-section views of a modular nozzle secured to the modular array unit shown in FIG. 10.
Figure 11B:
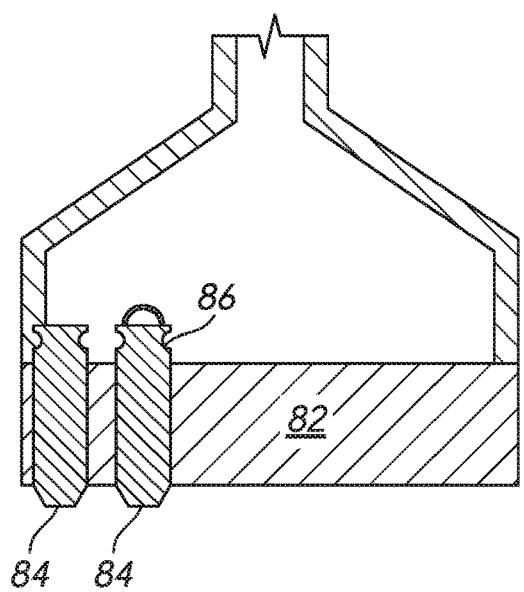

FIGS. 11A and 11B show cross-section views of the nozzles 84 installed in one of the array modules 82. As best shown in FIG. 11A, each nozzle 84 may have a grip recess 86 for assisting with installation and removal of the nozzle 84.

In an alternative embodiment (not shown), the nozzle modules 84 are configured to be directly connectable to other like nozzle modules 84. This allows an array to be formed from directly connecting nozzle modules 84 without requiring any frame 80 or array modules 82. It will be appreciated the connection of nozzle modules 84 may be achieved with one of a range of different mechanical and/or electro-mechanical approaches. For example, the nozzles 84 may include an interlocking tongue and groove features to enable interconnection of adjacent modular nozzles 84. Alternatively, each nozzle 84 may include one or more electromagnets arranged to secure adjacent nozzles together by magnetic forces.

Figure 12:
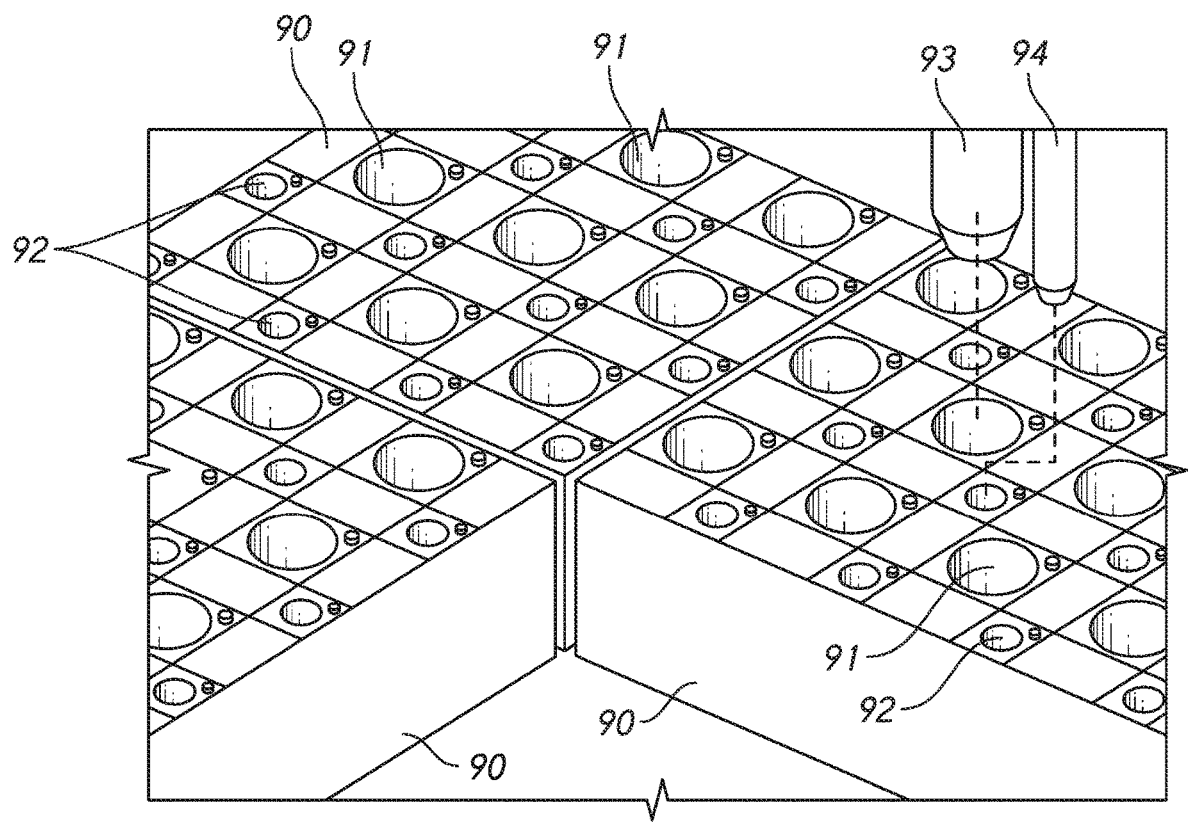
FIG. 12 is a perspective detailed view of alternative modular nozzles arranged adjacent modular arrays.

FIG. 12 shows a plurality of alternative array modules 90, each defining two different nozzle ports 91, 92. A first port 91 is configured to receive a first nozzle 93 and a second port 92 is configured to receive a second nozzle 94. The ports 91, 92 are arranged in a staggered grid, for example, to allow build materials expelled from nozzles 93, 94 installed in the ports 91, 92 to overlap. For example, the first nozzle 93 may be configured to expel a first build material which does not expand after deposition, whereas the second nozzle 94 may be configured expel a second build material which expands after deposition. In this configuration, when adjacent nozzles 93, 94 are operated to expel the respective build materials, the arrangement of the ports 91, 92 is configured to ensure the expansion of the second build material abuts the first material and exerts a defined force thereon. Alternatively, the nozzles 93, 94 are not operated simultaneously and instead, selectively operated only when arranged adjacent a location defined by the object geometry as requiring the build material that nozzle 92, 94 is configured to expel.

Figure 13A:
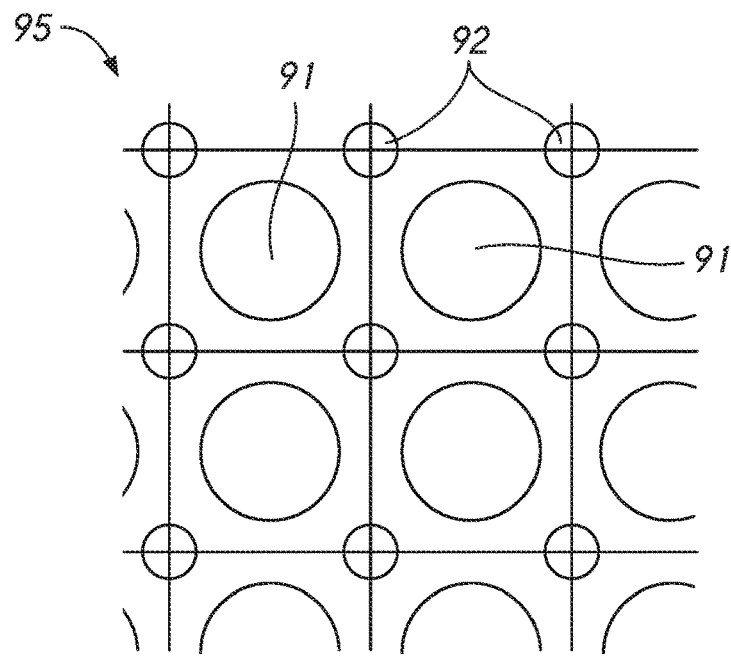
FIGS. 13A and 13B are top views of two configurations of the modular arrays shown in FIG. 12.
Figure 13B:
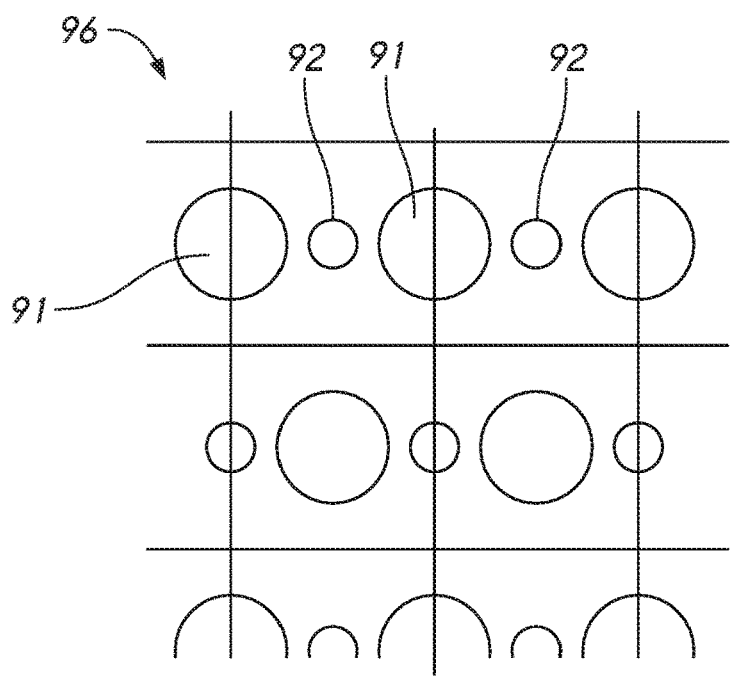

FIGS. 13A and 13B show alternative configurations of the array module, 95, 96 having different nozzle port 91, 92 arrangements, configured for different purposes. For example, array 96 is configured to decrease the likelihood of a fabricated object from delaminating, as the alternating arrangement of smaller ports 92 and larger ports 91 (and associated smaller and larger nozzles 93, 94) interlocks portions of the build material deposited therebelow, and therefore reduces or eliminates continuous lines of adjacent bonds between beads, which could allow a crack to propagate through an object. Array 95 is configured to optimise nozzle 93, 94 density per $m^2$, therefore enhancing fabrication resolution. The nozzles 93, 94 installed in either array module configuration 95, 96 may extrude the same build material and cause the extruded portions of build material to interlock. It will also be appreciated the arrangement of the nozzle ports 93, 94 may be configured in other ways to cause mechanical interference between build material expelled from the nozzles 93, 94 or enhance fabrication resolution. For example, an algorithm could be executed to determine the arrangement of nozzles 91, 92 in the array 95, 96 in a pattern configured to eliminate potential paths for crack propagation.

Figure 14A:
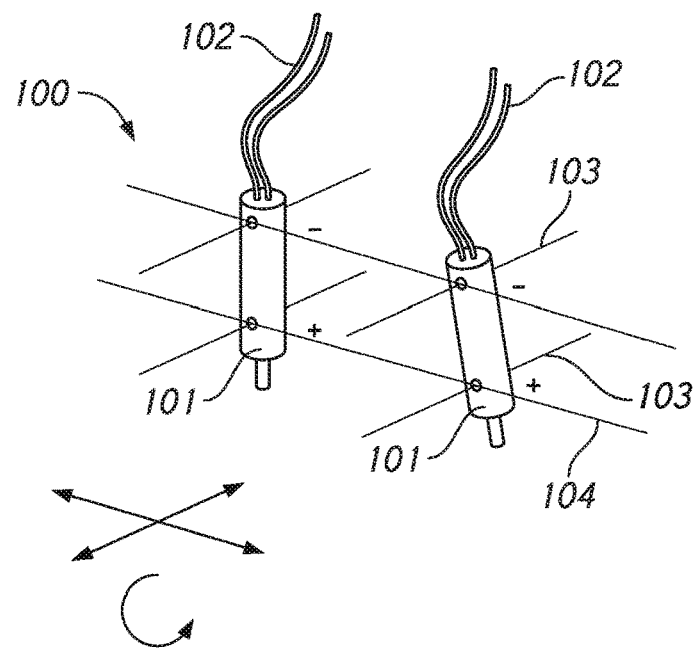
FIGS. 14A and 14B are perspective views of alternative nozzles arranged in an array, the nozzles being movable and rotatable relative to each other.
Figure 14B:
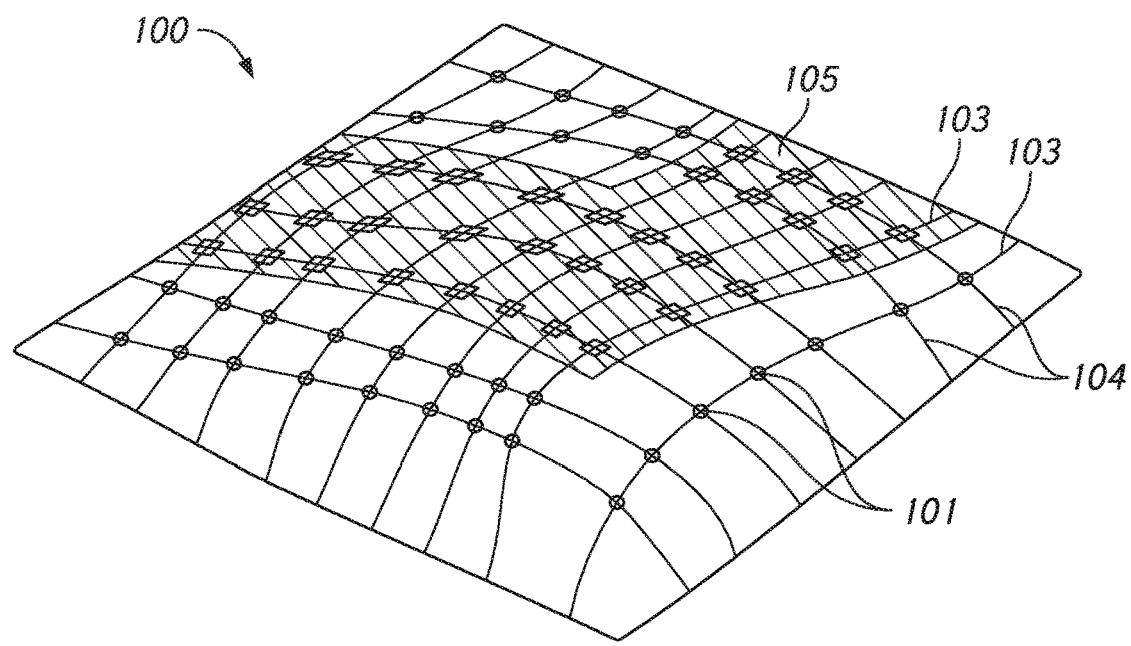

FIGS. 14A and 14B show an alternative array 100 embodiment including a plurality of nozzles 101 configured to expel a quantity of build material therefrom, each nozzle 101 in communication with a supply of the build material, in the embodiment shown in the figures by a hose 102 secured to each nozzle 101. Each of the nozzles 101 are further configured to be movable relative a plane defined by the array 100 by a nozzle translation mechanism, in the form of a plurality of first cables 103 and a plurality of second cables 104 extending in different directions and secured to the nozzles 101. The nozzles 101 are movable within the array by extending or retracting one or more of the cables 103, 104, for example, by winding one of the cables 103, 104 around a drum (not shown). This translated one or more of the nozzles 101 across the plane and potentially also reorientate the one or more nozzles 101, for example, by tilting the nozzle 101 relative to the plane. Typically, the cables 103, 104 are arranged in two adjacent layers, each layer secured to opposed ends 1011, 1012 of the nozzles 101. Relative movement of the cables 103, 104 in adjacent layers therefore allows tilting of the nozzles 101. Alternatively, each nozzle 101 has a driven drum (not shown) configured to wind a cable 103, 104 thereabout to adjust a length of a common cable 103, 104 connected between the nozzles 101, and thereby adjust the position and/or orientation of each nozzle 101. Further alternatively, the cables 103, 104 may be divided into sections (not shown) connected between the nozzles 101 and which are adjustable in length by heat, such as a shape memory alloy, or other means, to achieve the same result.

The array 100 allows the arrangement of the nozzles 101 to be adjusted prior to or during a build cycle, responsive to the geometry of an object 105 being fabricated by the array 100. Moving and/or tilting the nozzles 101 in the array 100 is particularly useful when a portion of the object geometry is defined as having high resolution surfaces, as the nozzles 101 can be moved towards each other to concentrate build material being deposited in that portion.

Figure 14C:
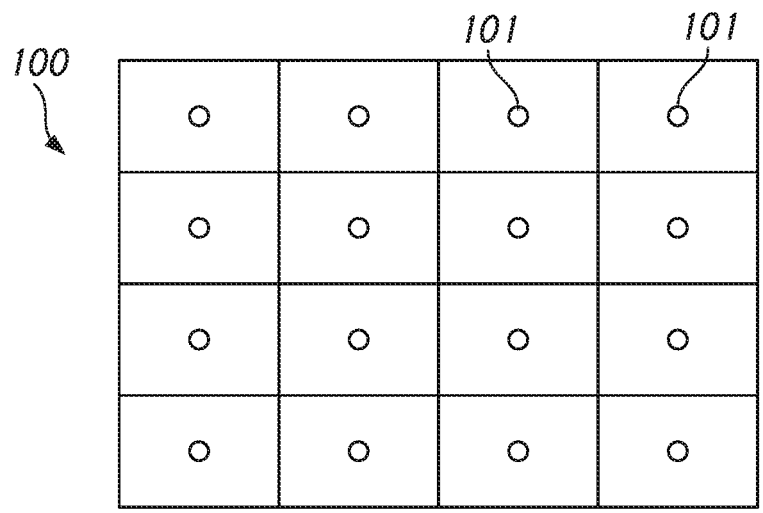
FIGS. 14C and 14D are top views of the array shown in FIGS. 14A and 14B.
Figure 14D:
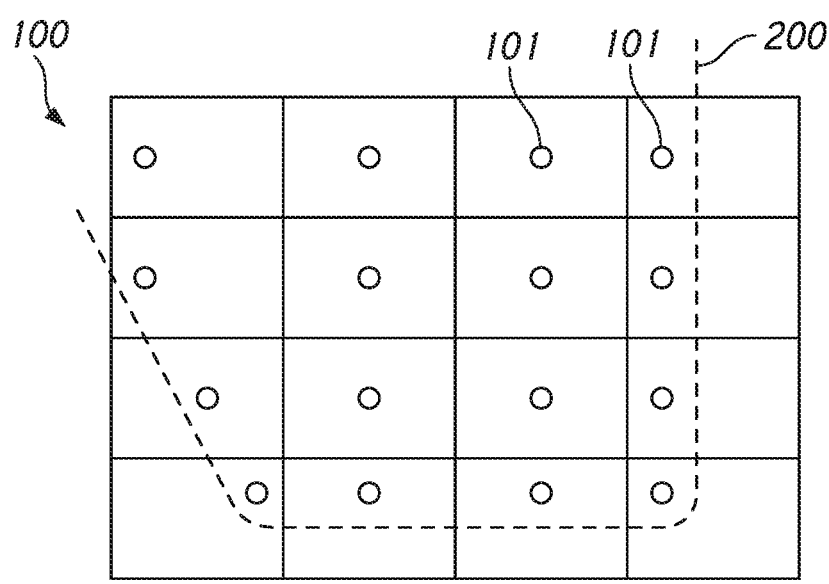

FIGS. 14C and 14D show two top views of the array 100 in two different configurations. In FIG. 14C, the nozzles 101 are arranged in regular grid, having a generally consistent separation distance between each nozzle 101. This is typically the default arrangement of the nozzles 101. In FIG. 14D, the nozzle 101 arrangement is optimised for fabricating a geometry of an object 200 therebelow, the profile of which is delineated in dashed line. Some of the nozzles 101 are rearranged by the nozzle translation mechanism to be within a perimeter of the object 200 cross-section and therefore positioned to fabricate a portion of the object 200. The movement of these nozzles 101 FIG. 14D may be dynamically performed during a build cycle to enable the apparatus to optimise the resolution of the object 200 being fabricated only when required.

Figure 15:
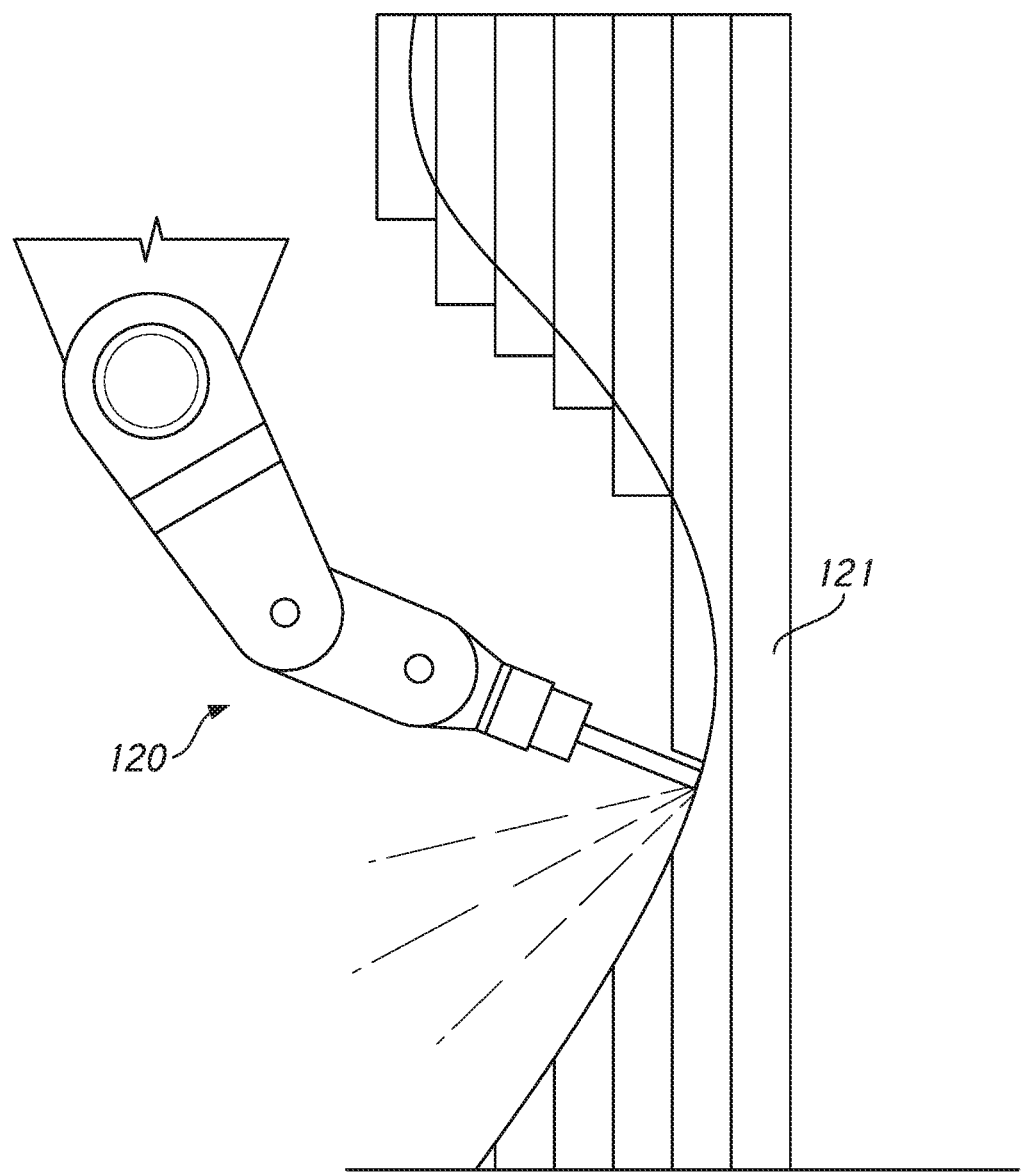
FIG. 15 is a side view of a robotic arm having a milling apparatus secured thereto.

FIG. 15 shows a robotic arm 120 configured to remove deposited build material from an object 121, for example, with a milling spindle. The arm 120 may form part of any of the apparatus previously described to allow the apparatus to selectively remove build material in addition to selectively deposit build material. This is particularly useful where the apparatus is configured to fabricate the object at low resolution, resulting in a stepped or otherwise rough surface finish. The arm 120 therefore allows the apparatus to smooth the surface finish of the object 121. It will be appreciated that the robotic arm 120 may also include other tools for modifying a fabricated object 121, for example, a fibre deployment head (not shown) for selectively applying fibres to the object 121 to form a rigid shell thereabout to increase the strength of the object 121.

Figure 16A:
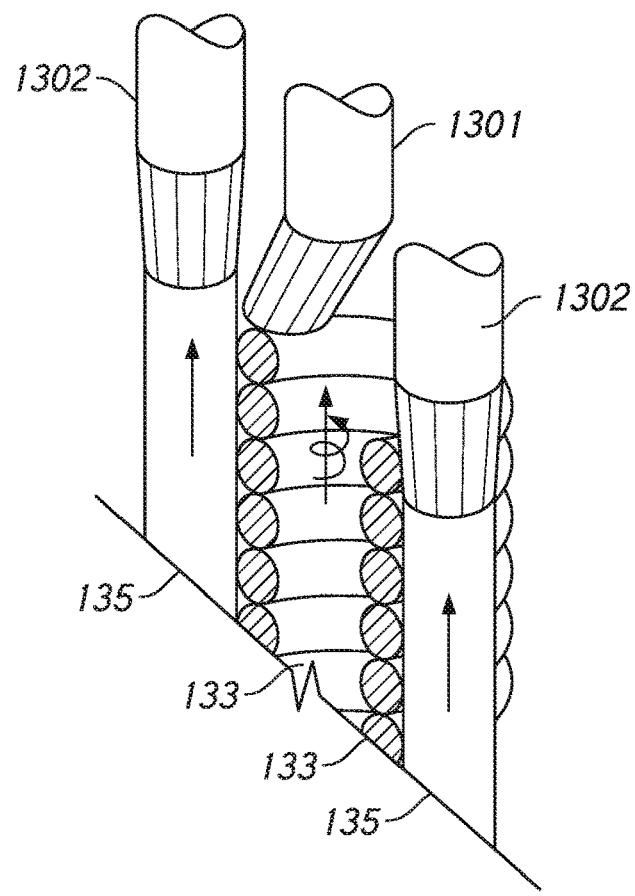
FIGS. 16A and 16B are perspective and side views of an alternative nozzle having an orifice adjustment mechanism.
Figure 16B:
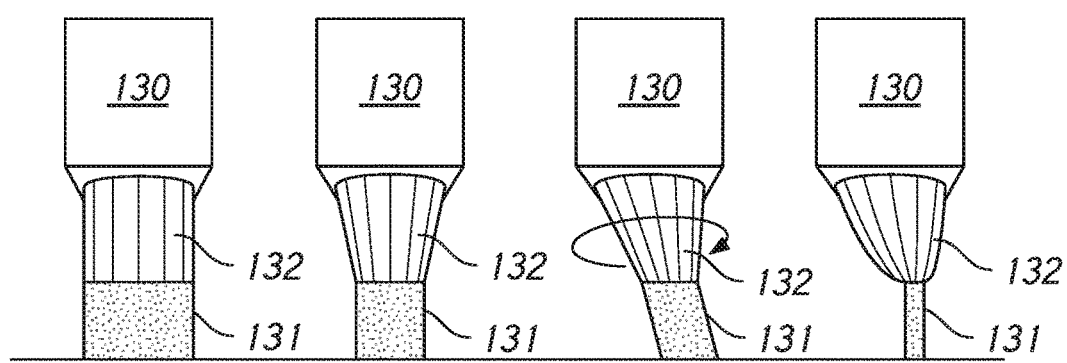

FIGS. 16A and 16B show detail views of an alternative nozzle 130 embodiment. The nozzle 130 is configured selectively expel build material 131 therefrom and also to adjust a direction the build material 131 is being expelled, and adjust a diameter of an expelled bead of the build material 131. The nozzle 130 includes an orifice translation mechanism 132 configured to adjust a shape and/or diameter of an orifice through which the build material is expelled by the nozzle 130, and also a position and/or orientation of the orifice. For example, the orifice adjustment mechanism may comprises a type of adjustable diaphragm, such as an iris mechanism having movable shutters which define the orifice and which rotate relative to each other to adjust the orifice. Alternatively, the adjustment mechanism may function according to the principles of thrust vectoring nozzles, as is known from a range of aircraft jet engines. The nozzle 130 may also be configured to selectively add fibres to the build material 131. This is particularly useful when adjusting a position and/or orientation of the orifice, and consequently a direction of a deposited bead of the build material 131, as the fibres can be orientated relative to the direction of the bead of build material 131.

FIG. 16A shows a particularly useful application of the nozzle 130 fabricating portions of an object having different densities. For example, as shown in FIG. 16A, when an air cavity 133 is required in an object, to form a lower density portion of the object, one nozzle 1301 can rotate whilst expelling the build material 131 at a high rate, thereby fabricating a helically arranged bead 134 defining the cavity 133, simultaneously with adjacent nozzles 1302 expelling vertically arranged beads 135 at a slower rate. This may also reduce the likelihood of the object fracturing due to delamination of adjacent beads 134, 135 and enhance strength of the object in specific directions.

Figure 17A:
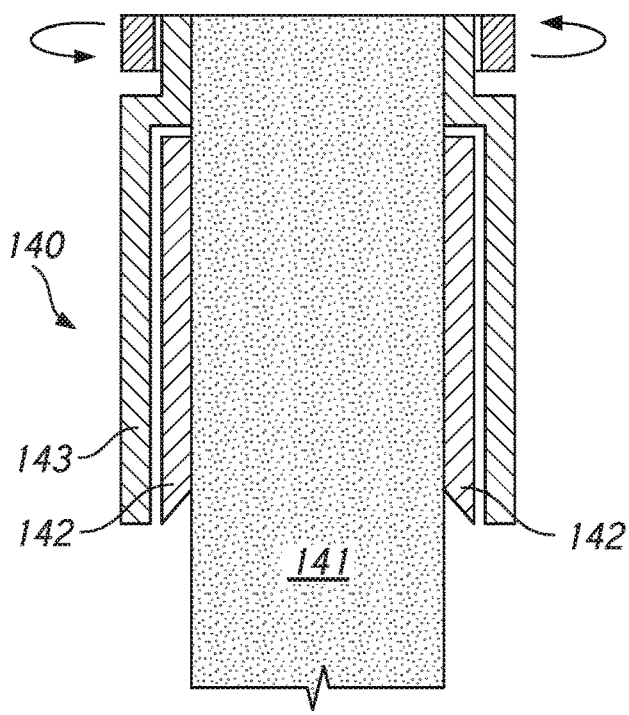
FIGS. 17A to 17D are cross-section views of an alternative orifice adjustment mechanism.
Figure 17B:
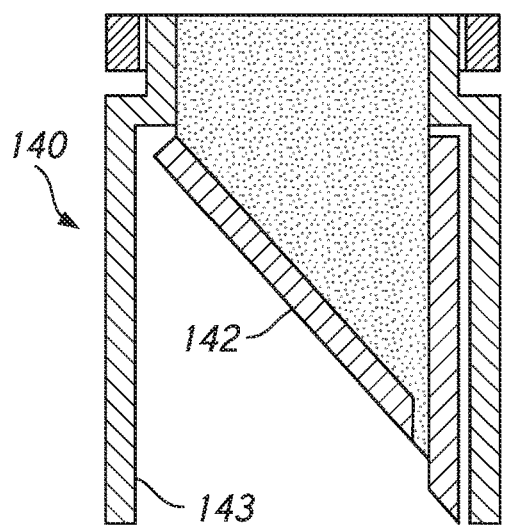
Figure 17C:
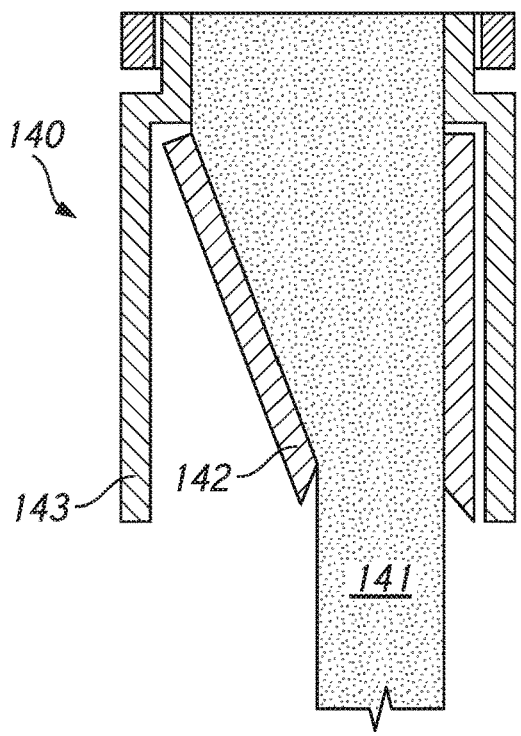
Figure 17D:
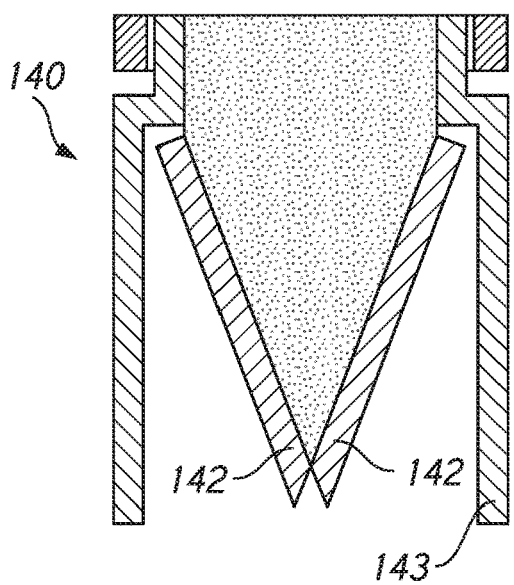

FIGS. 17A to 17D show cross-section views of a further alternative nozzle 140 embodiment. The nozzle 140 defines an orifice and is configured expel build material through the orifice, and further include an orifice adjustment mechanism to allow geometry of build material 141 expelled therefrom to be adjusted. The orifice adjustment mechanism includes two opposable flaps 142 pivotally connected to a housing 143. Each flap 142 is movable relative to the housing 143 to adjust a dimension of the orifice. FIG. 17A shows the flaps 142 arranged against the housing 143 to define a maximum sized orifice and therefore allow a maximum width bead 141 of the build material to be expelled therethrough. FIG. 17B shows one flap 142 pivoted against the other flap 142 to seal the orifice. FIG. 17C shows one flap 142 pivoted partly towards the other flap 142 to define a smaller orifice and consequently thinner bead 141. FIG. 17D shows both flaps 142 pivoted towards each other and abutting to seal the orifice. The pivoting of the flaps in this way, typically simultaneously with the build material being expelled from the nozzle 140, allows the geometry of the expelled build material to be progressively adjusted. It will be appreciated that the configuration of the nozzle 140 can be gradually adjusted from one of the configurations shown in FIGS. 17A to 17D to another to affect the geometry of the bead 141. It will be appreciated that whilst the planar pivotable flaps 142 are shown, the flaps 142 may alternatively be configured as non-planar, curved flaps (not shown) and arranged in one or more concentric annular regions.

Figure 18:
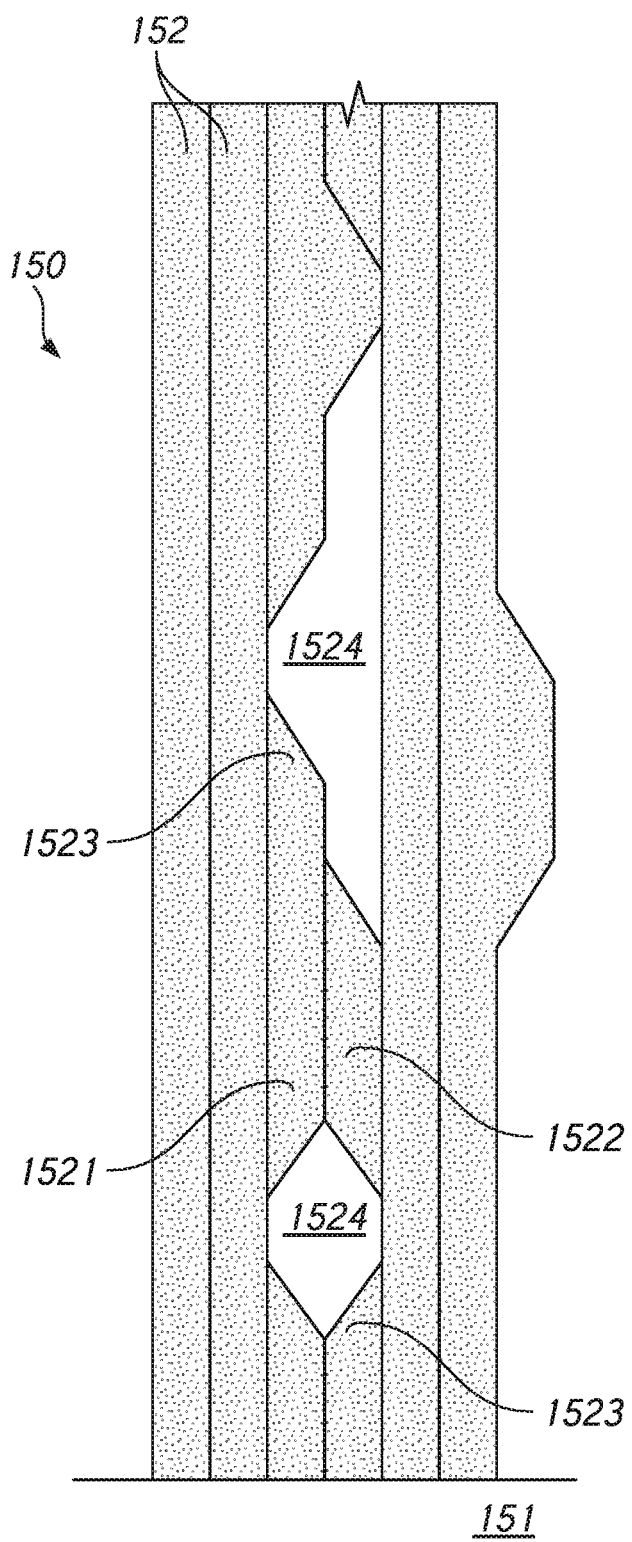
FIG. 18 is a cross-section view of an object fabricated by the apparatus shown in FIGS. 179A to 17D.

FIG. 18 shows an object 150 fabricated by any of the apparatus discussed above (not shown) operating a plurality of the nozzles 140 shown in FIGS. 17A to 17D arranged in an array (not shown). The object 150 has been fabricated by moving the nozzles 140 away from a substrate 151 and simultaneously selectively operating at least some of the nozzles 140 to deposit beads 152 of the build material. Whilst depositing some of the beads 1521, 1522, the orifice adjustment mechanism of some of the nozzles 140 is operated to gradually restrict and seal the respective orifices, and therefore adjust a width of the beads 1521, 1522. This causes the beads 1521, 1522 to form sloped sections 1523 which vary in width and define cavities 1524.

Figure 19:
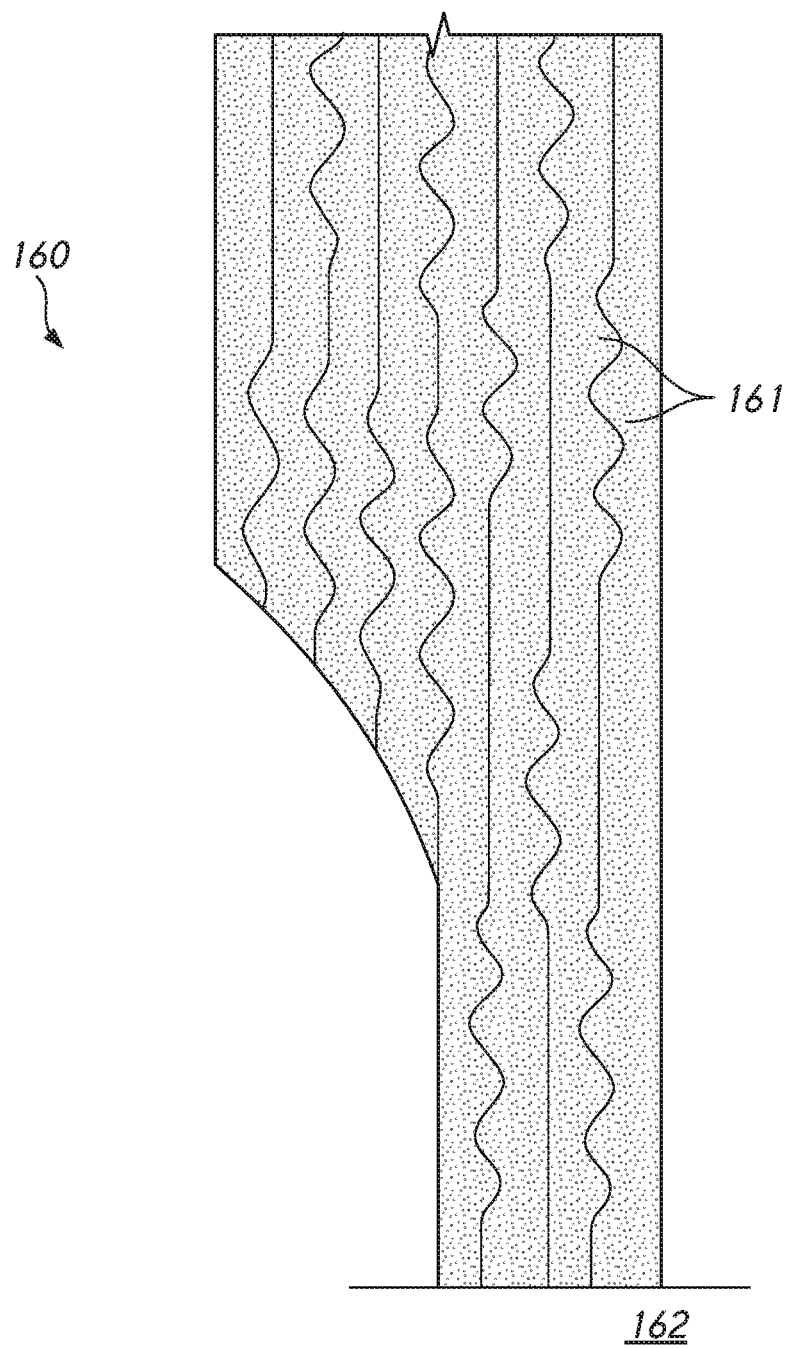
FIG. 19 is a cross-section view of an alternative object fabricated by one of the apparatus shown in the previous figures.

FIG. 19 shows another object 160 fabricated by any of the apparatus discussed above (not shown), whereby the array is moved relative to a substrate 162 and at least some of the nozzles simultaneously selectively operated to cause variable width beads 161 of the build material to be deposited. The width of adjacent beads 161 is coordinated by the controller to cause the adjacent beads 161 to have interlocking, undulating geometry. This typically involves the apparatus comprising a conveying mechanism configured to convey the build material to the nozzles, for example, one or more pumps, and adjusting operation of the conveying mechanism to cause a rate of build material being expelled from the nozzles to be adjusted, thereby adjusting the volume of material expelled. For example, the build material may be conveyed to adjacent nozzles at an alternating pulsed rate, causing alternating wider and thinner portions of build material to be expelled from the adjacent nozzles. Alternatively, adjacent nozzles may translate relative to the substrate 162 and each other, whilst expelling the build material at a constant rate, thereby affecting width of the beads 161.

Figure 20A:
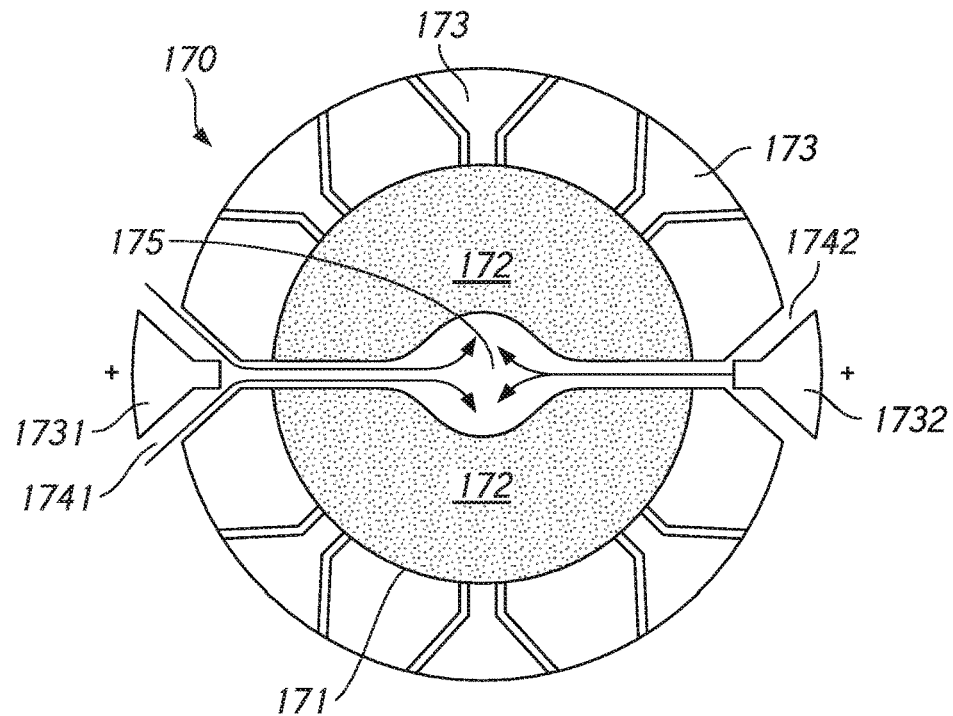
FIGS. 20A and 20B are cross-section views of a further alternative orifice adjustment mechanism.
Figure 20B:
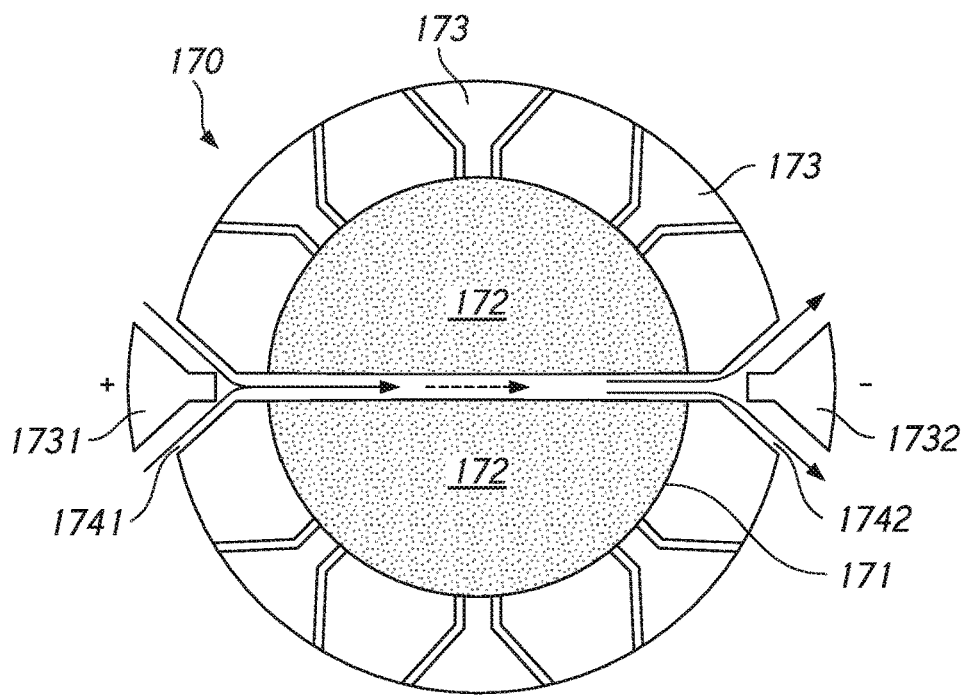

FIGS. 20A and 20B are cross-section views of a further alternative nozzle 170 embodiment. The nozzle 171 defines an orifice 171 and is configured to expel build material 172 therethrough. A plurality of movable plungers 173 are arranged around a periphery of the orifice 171 and arranged to seal a respective plurality of apertures 174. The apertures 174 are connected to various supplies, such as compressed air, a vacuum or an alternative build material. Operation of the plungers 173 causes the plungers 173 to move towards and away from orifice 171 to affect build material 172 being expelled through the orifice 171. For example, FIG. 21A shows a first plunger 1731 spaced apart from a first aperture 1741 connected to a supply of pressurised gas, and a second plunger 1732 spaced apart from a second aperture 1742 connected to a supply of pressurised gas. This allows the pressurised gasses to pass through the respective apertures 1741, 1742 and penetrate into the build material 172 to form a foamed section of build material, thereby affecting the properties of a deposited bead of build material 172. FIG. 21B shows an alternative configuration whereby the first aperture 1742 is connected to the supply of pressurised gas, and the second aperture 1742 is connected to a vacuum source. This allows the pressurised gas to pass through the build material 172 to divide the expelled build material 172 into two portions.

Figure 21:
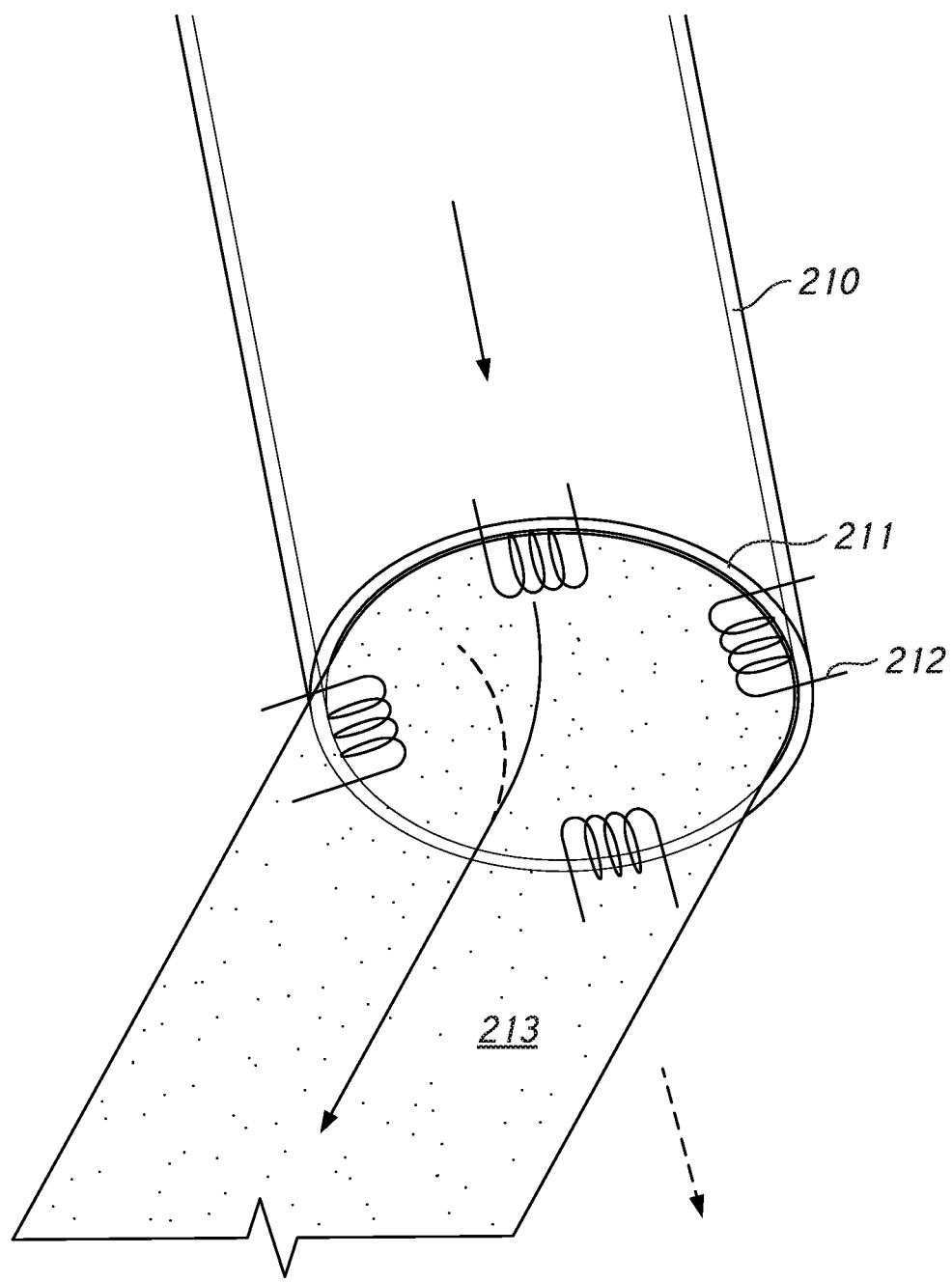
FIG. 21 is a perspective view of an aspect of a further alternative orifice adjustment mechanism.

FIG. 21 shows a further alternative nozzle 210 embodiment. The nozzle 210 defines an orifice 211 and is configured to expel build material therethrough. Arranged around a peripheral region of the orifice 211 are one or more selectively operable heating elements 212. The nozzle 210 is shown extruding a bead 213 of the build material, with only one of the four heating elements 212 being operated, thereby heating a corresponding portion of the bead 213 whilst being extruded. This localised heating of the build material affects the properties of the heated portion, for example, causing sublimation, which affects a direction the build material is being expelled from the nozzle 210. Alternatively, the nozzle 210 may substitute the heating elements 212 for other energy transmission means, such as microwave emitters (not shown) or vibration generators, dependent on the properties of the build material being deposited therefrom.

Figure 22A:
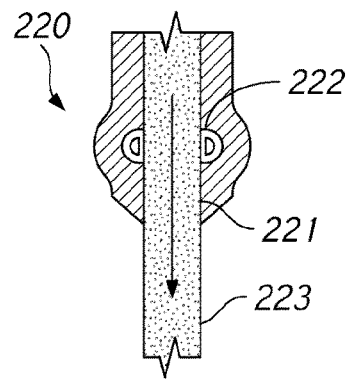
FIGS. 22A to 22C are cross-section views of a further alternative orifice adjustment mechanism.
Figure 22B:
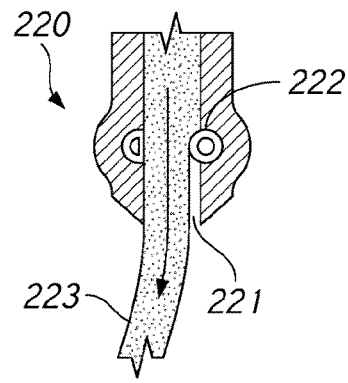
Figure 22C:
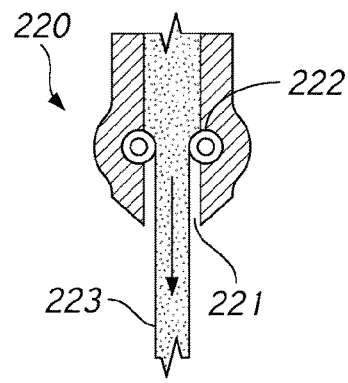

FIGS. 22A and 22B show a further alternative nozzle 220 embodiment. The nozzle 220 defines an orifice 221 and is configured to expel build material therethrough. A movable portion 222, such as an expandable bladder or diaphragm, is arranged within the orifice 221. Moving the movable portion 222 adjusts the geometry of the orifice and consequently adjusts the geometry of build material deposited therefrom. The movable portion 22 is typically formed from a resiliently deformable material, such as a heat memory alloy or a polyurethane plastic. The nozzle 220 is shown expelling a bead 223 of the build material. In FIG. 23A, the movable portion 222 is not operated, therefore allowing a maximum width bead 223 to be expelled through the orifice 221. In FIG. 23B, one side of the movable portion 222 is operated to partially restrict the orifice 221, thereby restricting a width of the bead 223 and diverting the bead towards one side of the nozzle 220. In FIG. 23C, both sides of the movable portion 222 are operated to partially restrict the orifice 221, thereby restricting the width of the bead 223 but not divert the extrusion direction.

Figure 23:
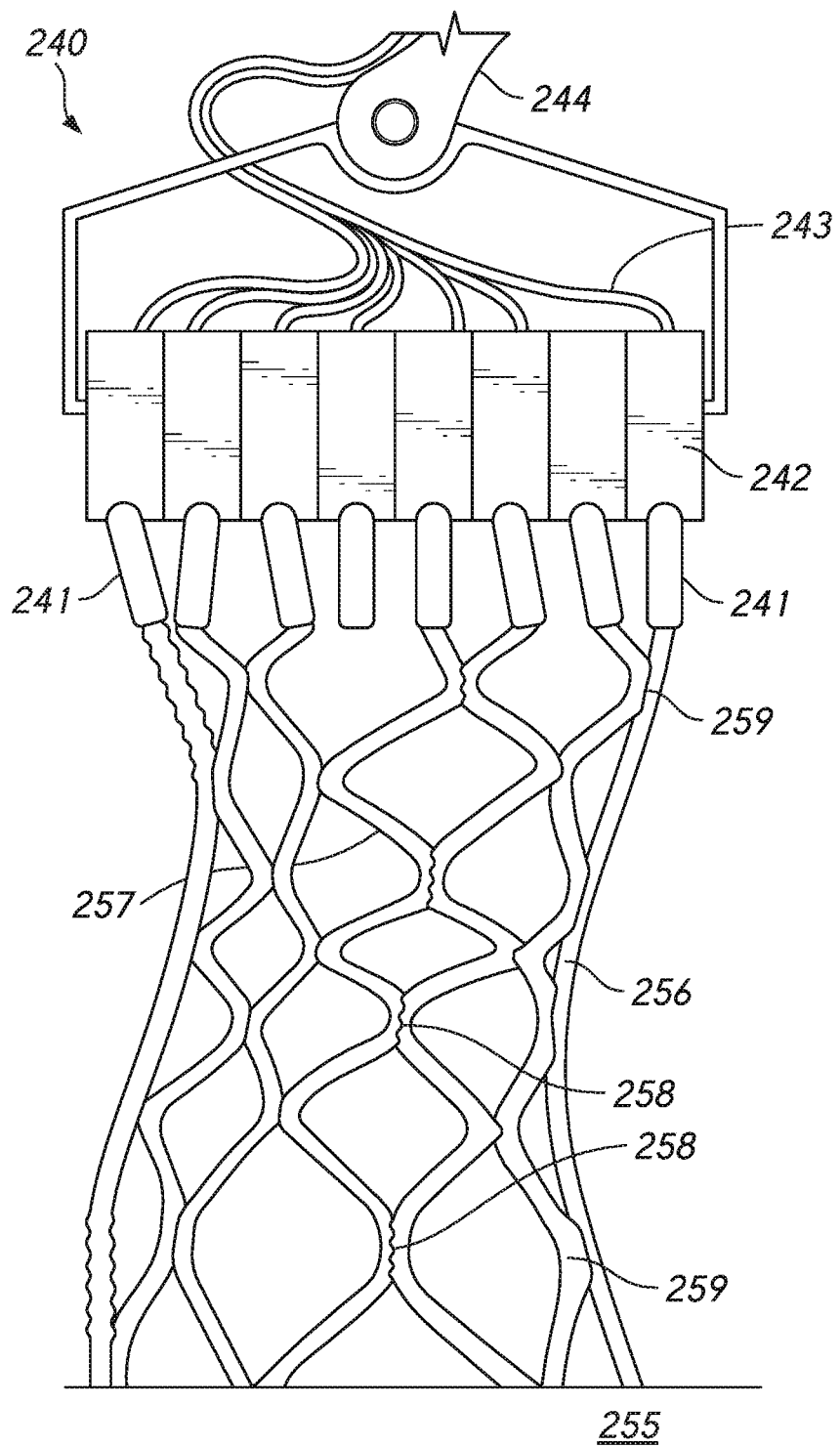
FIG. 23 is a side view of a side view of a further alternative apparatus having a rotatable and movable nozzle array and fabricating a further alternative object on a substrate.
Figure 24A:
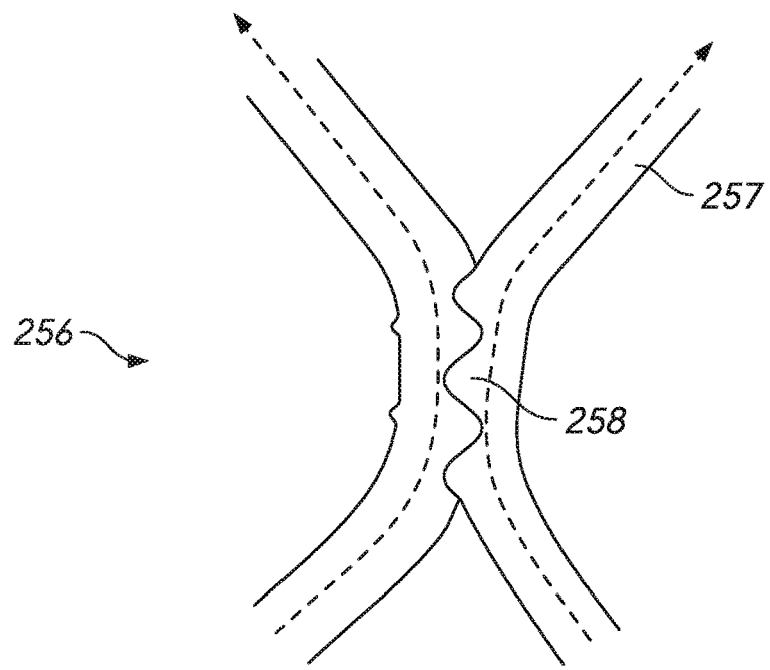
FIGS. 24A and 24B are detailed views of aspects of the object shown in FIG. 24.
Figure 24B:
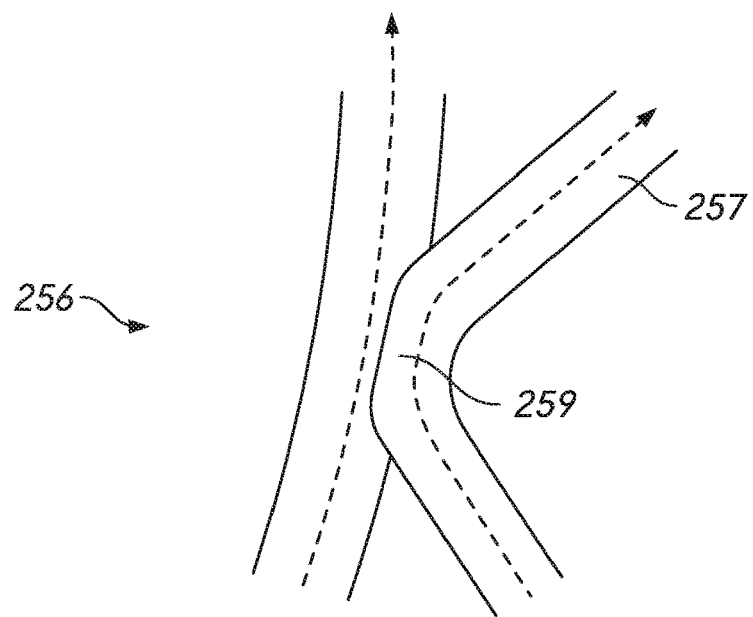

FIG. 23 shows an alternative apparatus 240 including a plurality of nozzles 241 arranged in an array 242, each of the nozzles 241 in communication with a supply of build material, in the embodiment shown in FIG. 24 via hoses 243, and configured to expel a quantity of the build material therefrom. Depending on the configuration of the build material, the nozzles 241 may also include a vibration mechanism to vibrate the build material immediately prior to expelling the build material, to induce shear thinning of the build material or otherwise assist the build material flowing from the nozzle 241. The build material is conveyed to the nozzles 241 by a conveying mechanism (not shown), such as a pump, which may be adjustably operated to adjust a rate of the build material being expelled from one or more of the nozzles 241. Each nozzle 241 is rotatably connected to the array 242 and rotatable about at least one axis. It will be appreciated rotation of each nozzle 241 about one or more axes may be achieved by one or a range of mechanisms, such as coupling the nozzle 241 to an electric motor and gimbal-type linkage, and potentially further include a resilient element, such as a spring, to bias the nozzle 241 in a direction. Typically, a radius of rotation of each nozzle 241 is configured to overlap with a radius of rotation of at least one other nozzle 241, thereby allowing the nozzles 241 to have overlapping ranges of motion in which the build material can be expelled. The array 242 is connected to an array translation mechanism, in the form of a robotic arm 244, and is typically also rotatable about at least one axis defined by the arm 244, and operation of the arm 244 moves and/or rotates the array 242 relative to a substrate 255.

An object 256 is shown partially fabricated on the substrate 255. The object 256 has been fabricated by progressively moving the array 242, with the arm 244, away from the substrate 255 and typically simultaneously operating at least some of the nozzles 241 to deposit portions of the build material in specific locations corresponding with a geometry of the object 256. Responsive to the geometry, at least some of the nozzles 241 are also rotated allowing adjustment of a direction the build material is expelled from the nozzles 241. This may also involve operating the vibration mechanism to increase flow rate of the build material, particularly when the nozzle 241 is arranged at a steep angle relative to the substrate 255, for example, at or less than 20 degrees. Rotation of the nozzles 241 whilst expelling the build material allows the apparatus 240 to fabricate complex geometry, such as a framework structure 257 defined in an internal portion of the object 256 geometry. Furthermore, responsive to the geometry, the rate of build material being expelled from at least some of the nozzles 241 is adjusted to affect geometry of specific portions of expelled material. For example, where the framework 257 geometry forms nodes, it may be useful to alternately pulse the rate of build material being supplied to adjacent nozzles 241 by adjustably operating the conveying mechanism to cause undulating portions of geometry 258 to be formed to increase surface area therebetween and enhance bonding in these portions. Alternatively, at a node, it may be useful to gradually increase the rate of build material being expelled from one nozzle 141 and simultaneously decrease the rate of build material being expelled from an adjacent nozzle 141 to cause interlocking portions of geometry 259 to be formed. This is further enhanced by the range of the adjacent nozzles 241 being configured to overlap, as the respective portions of expelled build material can merge. The undulating portions 258 and interlocking portions 259 are shown in more detail in FIGS. 25A and 25B.

Figure 25:
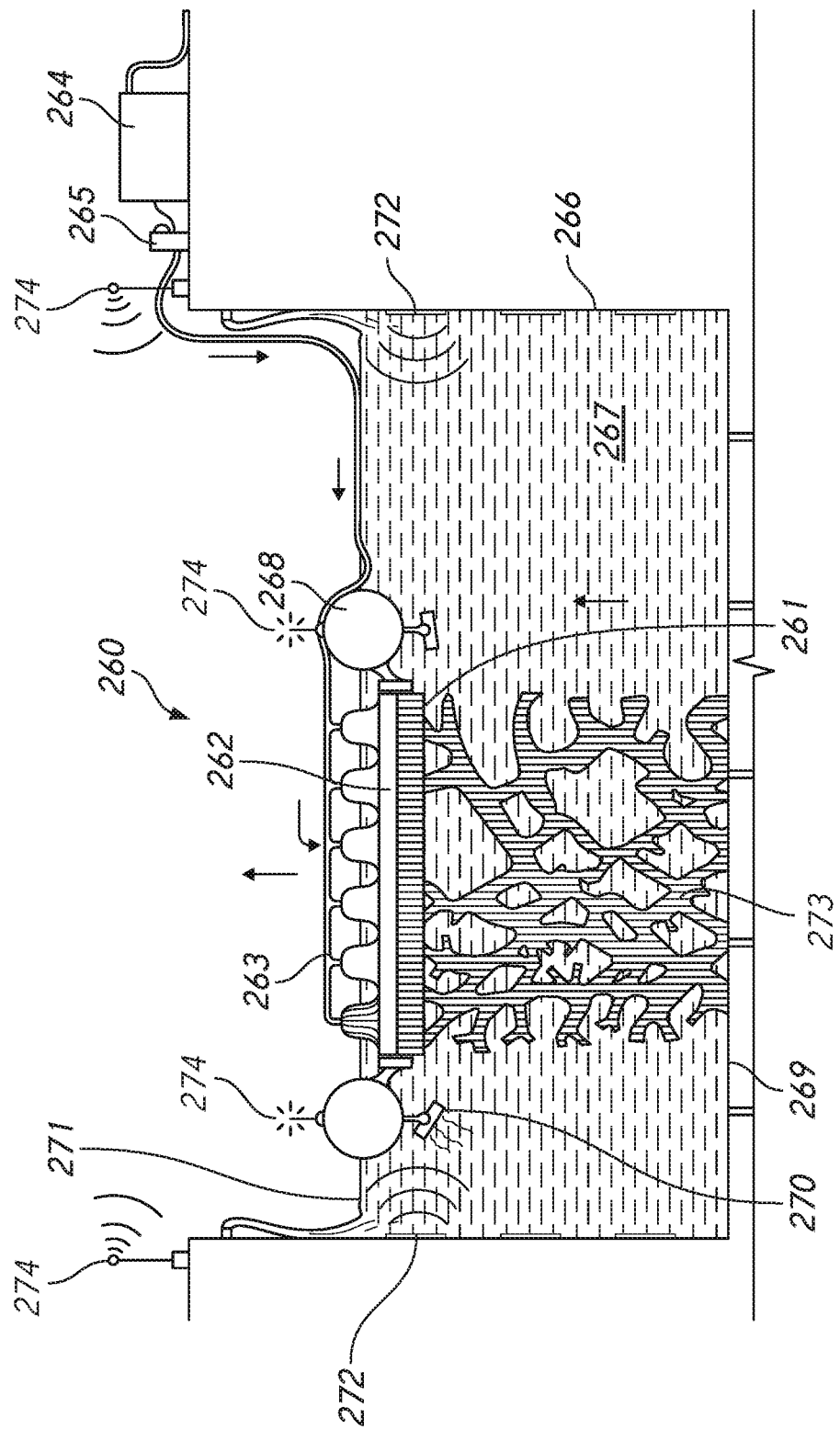
FIG. 25 is a side view of a further alternative apparatus having an array suspended in fluid-like material contained in a reservoir.
Figure 26:
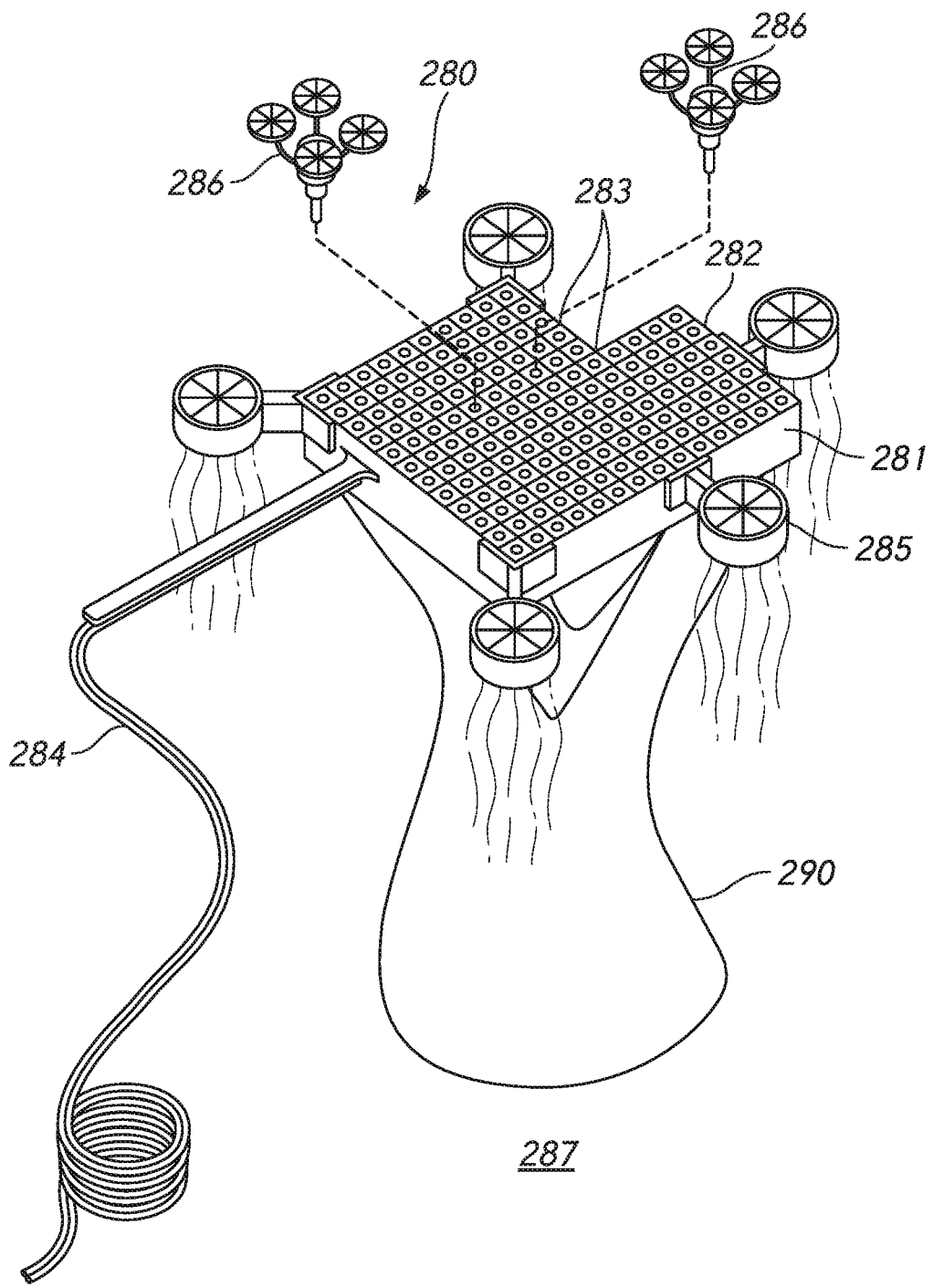
FIG. 26 is a perspective view of a further alternative apparatus having an apparatus connected to one or more rotor assemblies and hovering above a substrate to fabricate an object.

FIG. 25 shows an alternative apparatus 260 including a plurality of nozzles 261 arranged in an array 262, each of the nozzles 261 in communication with a supply of build material, in the embodiment shown in FIG. 26 via hoses 263, and configured to expel a quantity of the build material therefrom. The build material is conveyed from a remote reservoir 264 to the nozzles 261 by a conveying mechanism, in the form of a pump 265. The array 262 is arranged within a main reservoir 266 containing fluid-like material 267 and the array 262 is suspended in the fluid-like material 267, typically by one or more buoyant portions 268. A bottom surface 269 of the reservoir 264 defines a substrate and the array 262 is movable relative to the substrate by a further alternative array translation mechanism, including at least one of a marine propulsion mechanism, such as thrusters 270, and adjusting the volume of fluid-like material 267 contained in the reservoir 26 by adding or removing a volume of the fluid-like material 267 from the reservoir 266 to adjust a height of a top surface 271 of the fluid-like material on which the array 262 is suspended.

The fluid-like material 267 is configured according to the properties of the build material to assist with at least one of supporting the build material whilst curing and affecting the rate of curing. For example, the fluid-like material 267 may be configured as a liquid which is less dense than the build material, and therefore support some of the weight of the build material whilst curing, for example, to prevent slumping due to gravity. Alternatively or additionally, the fluid-like material 267 may contain a catalyst configured to accelerate curing of the build material. Further alternatively, the fluid-like material 267 may be configured as shear thinning material configured to become less viscous when agitated. In this scenario, the fluid-like material 267 can effectively act as a mould for the deposited portions of build material whilst curing, as the fluid-like material 267 can be arranged around build material shortly after deposition when in an excited and less viscous (thinned) state, and then allowed to become more viscous (thicken) to support the build material whilst curing. To assist with this approach, one or more vibration generators 272 may be arranged relative to the reservoir 266 to vibrate the fluid-like material 267, particularly material 267 proximal to the top surface 271 and recently deposited build material. Alternatively or additionally, the one or more vibration generators may be arranged within the reservoir (not shown) as stand-alone units suspended in the fluid-like material 267. Further alternatively or additionally, the one or more vibration generators may be affixed to the array 262 to allow vibration of fluid-like material 267 adjacent the array 262. In the embodiment shown in FIG. 26, each vibration generator 272 comprises a vibrating panel arranged adjacent a wall of the reservoir 266 to vibrate at least a portion of the fluid-like material 267. It will be appreciated that the term 'vibration' includes linear oscillation and rotary agitation within its scope.

An object 273 is shown partially fabricated in the reservoir 266. The object 273 has been fabricated by progressively moving the array 262 away from the substrate 269 and typically simultaneously operating at least some of the nozzles 261 to deposit portions of the build material in specific locations corresponding with a geometry of the object 273. This is typically achieved by floating the array 261 on the top surface 271 of the fluid-like material 267 and progressively adding fluid-like material 267 to the reservoir 266 to adjust a level of the top surface 271 and therefore increase a distance between the top surface 271 and the substrate 269. To enhance positional accuracy and/or stability of the array 261 in the fluid-like material 267 the thrusters 270 may also be operated, potentially responsive to positional data provided by sensors 274 arranged on the array 262 and the reservoir 266 defining a relative position of the array 262 in the reservoir 266 This is particularly useful when a plurality of arrays 262 are arranged in a common reservoir 266 and operated independently.

FIG. 26 shows an alternative apparatus 280 including a modular array assembly 281 comprising a plurality of connected like array modules 282 typically forming a planar array, each module 282 housing a plurality of nozzles 283 in communication with a supply of build material, in the embodiment shown in FIG. 26 via a tether 284, and configured to expel a quantity of the build material therefrom. Each array module 282 is typically configured to mechanically, hydraulically and electrically couple with other like array modules 282, therefore communicating power and build material between modules 282 connected together to form the array assembly 281. The build material is conveyed from a remote reservoir (not shown) to the array assembly 281 and then to each nozzle 283 by a conveying mechanism, such as a pump (not shown). The array assembly 281 is shown arranged relative to a substrate 287 and is movable relative to the substrate by an array translation mechanism, in the embodiment shown in FIG. 27 being in the form of a plurality of rotor assemblies 285 connected to the array assembly 281. Each rotor assembly 285 includes a plurality of rotor blades coupled to a motor and rotatable about a common axis to provide lift. It will be appreciated various rotor assemblies are known in the art and suitable for use with the apparatus 280. For example, a ducted fan dual counter-rotating rotor assembly is particularly useful where the apparatus 280 is employed in urban environments having turbulent winds, as this sort of rotor assembly mitigates the effect of forces exerted by such winds which could, for example, affect positional accuracy of the array assembly 281. The tether 284 also provides power to the array assembly 281 and therefore powers each rotor assembly 285. The apparatus 280 also includes a controller (not shown) configured to control operation of each nozzle 283 and each rotor assembly 285, responsive to data relating to an object geometry.

Optionally, the apparatus 280 may also include one or more re-fueling vehicles 286 including a reservoir (not shown) for containing a volume of the build material and configured to couple with the array assembly 281 to provide additional build material to one or more of the array modules 282. The re-fueling vehicle 286 may be configured as a copter style unmanned aerial vehicle (UAV) appropriately specified to carry a sufficient payload. Such vehicles are well-known in the art, for example, a UAV similarly configured to the Freefly Systems Inc. "Alta 8" vehicle, capable of carrying around 18 kg for up to 10 minutes, is typically appropriate to provide the function of the re-fueling vehicle 286.

An object 290 is shown partially fabricated by the apparatus 280. The object 290 has been fabricated by initially constructing the array assembly 281 on the substrate 287 according to a geometry of the object 290, that is, connecting sufficient numbers of array modules 282 together in a configuration which is dimensioned to exceed a maximum cross-section of the object 290 geometry, and then progressively moving the array assembly 281 away from the substrate 287 with the rotor assemblies 285, and, typically simultaneously, operating at least some of the nozzles 283 to deposit portions of the build material in specific locations corresponding with the object 290 geometry. Operating the rotor assemblies 285, causes the array assembly 281 to hover above the substrate 287, thereby elevating the array assembly 281 relative to the substrate 287. As power and the build material are supplied to the array assembly 281 and associated rotor assemblies 285 via the tether 284, the weight of the array assembly 281 can advantageously be minimised to enhance efficiency of operating the apparatus 280 to fabricate the object 290. This embodiment of the apparatus 280 is particularly useful for remote environments having little or no established infrastructure and/or where it would be difficult or prohibitively expensive to erect a crane or scaffold to enable elevating the array assembly relative to the substrate 287. There are a number of well-known disadvantages relating to using scaffolds in the construction industry, for example, health risks to workers, time to erect/disassemble the scaffold, risk of damage to existing structures (particularly heritage-listed structures), and cost to purchase or rent the scaffold. The apparatus 280 is therefore particularly useful in situations to avoid erecting a scaffold, for example, in a high-density urban environment having restricted access. Furthermore, in some situations use of the apparatus 280 would prove more efficient than erecting a scaffold as the structure may be fabricated in a shorter period than would be required to erect the scaffold.

Figure 27:
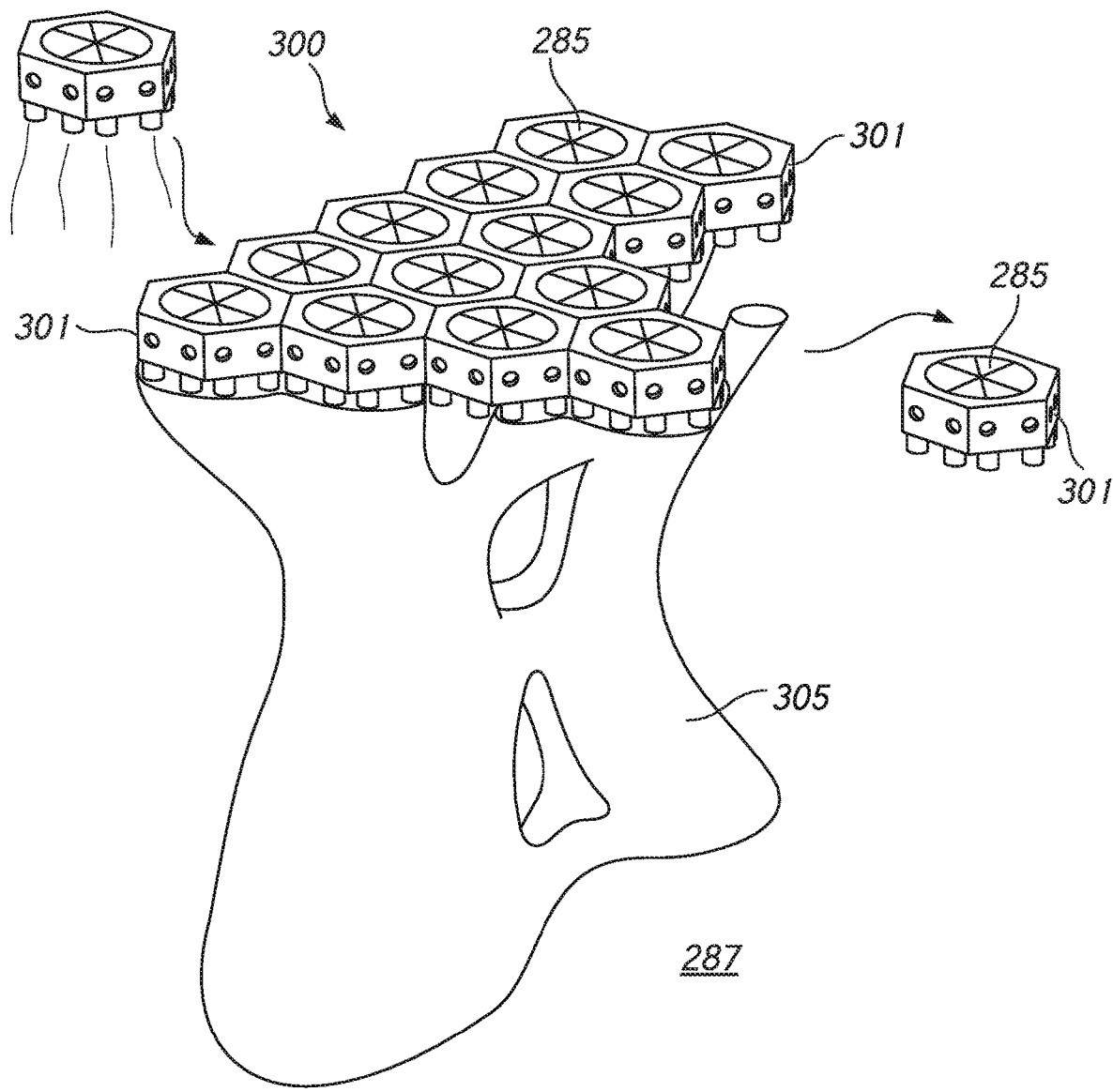
FIG. 27 is a perspective view of an alternative configuration of the apparatus shown in FIG. 26.

FIG. 27 shows an apparatus 300 which is an alternative configuration of the apparatus 280 shown in the previous figure, whereby common reference numerals indicate common features. In the apparatus 300, the array assembly 281 includes alternative array modules 301 which mechanically couple to other like modules 282 and has a hexagon shaped body to assist coupling with other like modules 301 to form a robust assembly 281. Each array module 281 houses a plurality of the nozzles 283 arranged in a sub-array and in communication with an on-board supply of the build material, in the embodiment shown in FIG. 27 contained in one or more reservoirs (not shown), and configured to expel a quantity of the build material therefrom. Each array module 301 also includes a rotor assembly 285 configured to elevate the array module 301, typically relative to the substrate 287, and a power source, typically being a battery. The apparatus 300 further includes a controller (not shown) arranged remote from the array assembly 281 and configured to communicate wirelessly therewith to control operation of the nozzles 283 and rotor assemblies 285, responsive to data relating an a geometry of an object.

An object 305 is shown partially fabricated by the apparatus 300. The object 305 has been fabricated by initially constructing the array assembly 281 on the substrate 287 according to the geometry of the object 290, that is, connecting sufficient numbers of array modules 301 together, and then progressively moving the array assembly 281 away from the substrate 287 and, typically simultaneously, operating at least some of the nozzles 283 to deposit portions of the build material in specific locations corresponding with a geometry of the object 305. Movement of the array assembly 281 relative to the substrate 287 is achieved by operating at least some of the rotor assemblies 285, causing the array assembly 281 to hover above the substrate 287. Depending on environmental factors, such as wind, in some scenarios all of the rotor assemblies 285 are operated simultaneously throughout the fabrication process to elevate the array assembly 281. In other scenarios, such as illustrated in FIG. 28B, in order to minimise turbulent flow generated by the rotor assemblies 285 which can affect setting of the build material, only the rotor assemblies 285 connected to array modules 301 arranged around a periphery of the array assembly 281 are operated to elevate the array assembly 281.

Depending on the object 305 geometry, at least some of the array modules 301 deposit all of the build material contained in the on-board reservoir and/or consume all charge stored in the on-board power supply before the object 305 is fabricated, causing the array module 301 to disconnect from the array assembly 281 and return to a re-fueling station (not shown). When this occurs, fabrication of the object 305 may be paused and a reserve array module 281 deployed and substituted for a depleted array module 281 in the array assembly 281, thereby minimising a non-fabrication period. Alternatively, the coupling of reserve array modules 281 to the array assembly 281 and decoupling of depleted array modules 281 from the array assembly 281 may occur substantially continuously, whereby reserve modules 281 couple to one side of the array assembly 281 at the same rate as depleted modules are removed from the other side, effectively causing the array modules 281 to progressively move across the array assembly whilst fabricating the object 305. Further alternatively, the array modules 281 may be configured to move independently of each other throughout the fabrication process, that is the modules 281 do not mechanically couple, thereby allowing the substitution of a depleted array module 281 with a reserve module 281 to occur in situ and on an ad-hoc basis without fabrication of the object 305 pausing. In this embodiment, the array modules 281 translate towards and away from the substrate 287 independently of each other, thereby allowing each array module 281 to continuously fabricate a defined portion of the object 305 independent of the other array modules 281. It will be appreciated duration of operation of each array module 281 will depend on the volume of build material able to be contained in its reservoir and the geometry of the object 305, and therefore for very large objects, substituting a depleted array module 281 with a reserve module 281 will be executed many times during the fabrication process.

Figure 28A:
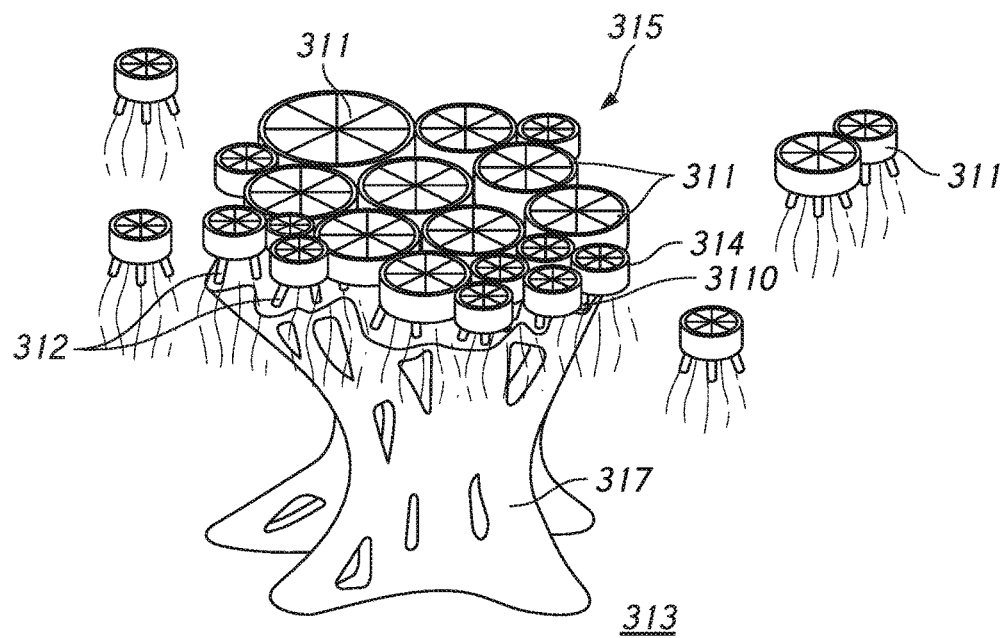
FIGS. 28A and 28B are perspective views of an alternative apparatus having an array formed from a plurality of independently flyable array units.
Figure 28B:
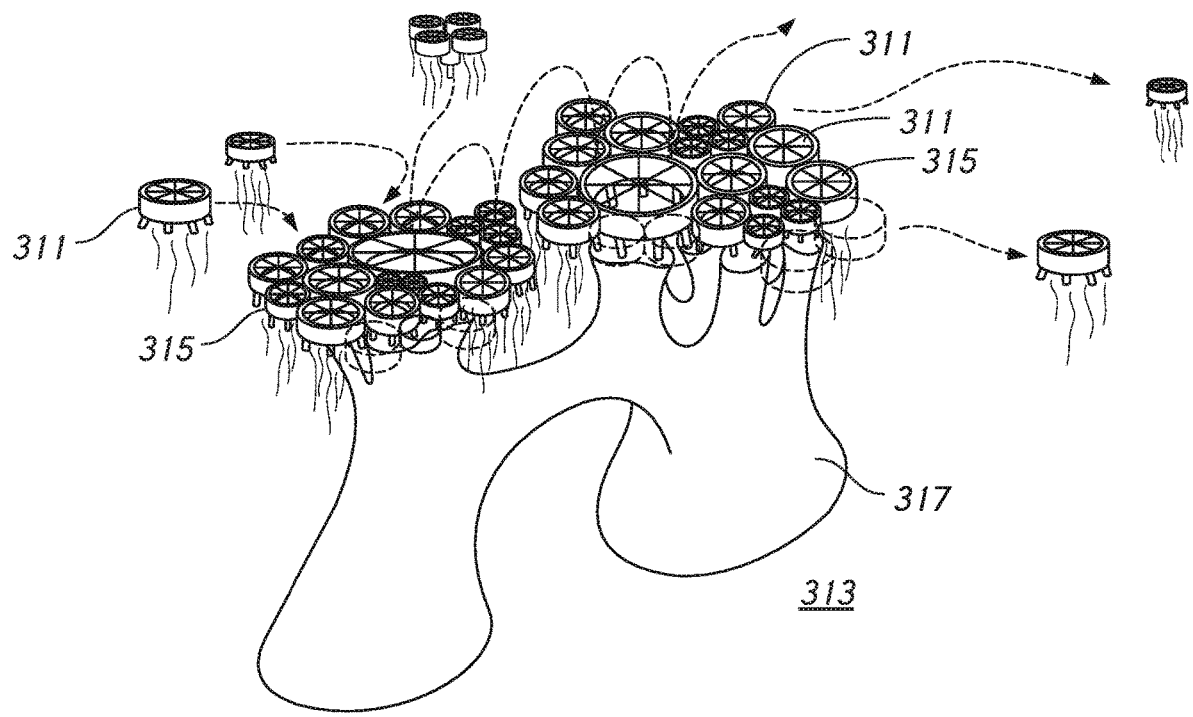

FIGS. 28A and 28B shows an alternative apparatus 310 including a plurality of UAVs 311 configured to deposit build material. Each UAV 311 houses at least one nozzle 312 in communication with an on-board supply of the build material and is configured to expel a quantity of the build material therefrom. Each UAV 311 also includes at least one rotor assembly 314 configured to elevate the UAV 311, and a power source, typically being a battery. The UAVs 311 are shown elevated away from a substrate 313 and arranged adjacent each other to form an array 315. This may involve temporarily connecting adjacent UAVs 311 together to assist stabilising the array 315 whilst elevated. For example, each UAV 311 may include a docking mechanism, such as mating magnetic portions, 'hook-and-loop' structures, or cooperating mechanical structures, to allow temporary docking of one UAV 311 with another during flight. When configured in this way, the UAVs 311 arranged around a peripheral region of the array 315 can support the weight of the connected UAVs 311 arranged within this region, therefore allowing the rotor assemblies 314 of the UAVs 311 arranged within the peripheral region to be powered down whilst the respective UAVs 311 deposit portion of build material, advantageously minimising turbulent flow generated by the array 315.

The apparatus 310 typically includes a range of differently dimensioned, and potentially different shaped, UAVs 311, and the array 315 is formed by selecting one or more of the range of different UAVs 311 depending on a geometry of an object. For example, where the geometry requires high resolution, fine surfaces, a small UAV 3110 joins the array. Conversely, where the geometry requires low resolution, bulk filling, a large UAV 3111 joins the array 315. This may occur dynamically throughout a build process depending on the geometry. Furthermore, the shape and/or dimensions of the UAVs 311 may be configured to be modular whereby that one large UAV 3111 may be substituted for three medium UAVs or seven small UAVs 3110. The apparatus further includes a controller (not shown) arranged remote from the array 315 and configured to communicate wirelessly with each UAV 311 to control operation of the nozzles 312 and rotor assemblies 314, responsive to data relating to the object geometry. Typically, the controller is configured to move all of the UAVs 311 independently of each other and coordinate relative motion of the UAVs 311 responsive to the data. It will be appreciated each UAV 311 may be configured as a copter style unmanned aerial vehicle (UAV) appropriately specified to carry a sufficient payload, many example of which being well-known in the art, for example, a UAV similarly configured to the Az "Green Bee" 4K UHD camera drone, capable of carrying around 20 kg for up to 20 minutes.

An object 317 is shown partially fabricated by the apparatus 310 in FIGS. 29A and 29B. The object 317 has been fabricated by initially forming the array 315 adjacent the substrate 313 according to the geometry of the object 290, that is, selecting appropriate dimensioned and/or shaped UAVs 311 and arranging these together to form the array 315, and then progressively moving the array 315 away from the substrate 313 and, typically simultaneously, operating at least some of the nozzles 312 to deposit portions of the build material in specific locations corresponding with a geometry of the object 317. Movement of the array assembly 281 relative to the substrate 287 is achieved by operating the rotor assemblies 314, causing the array 315 to hover above the substrate 287. Typically, at least some of the UAVs 311 deposit all of the build material contained in the on-board reservoir and/or consume all power stored in the on-board power supply before the object 317 is fabricated, causing the UAV 311 to leave the array 315 to return to a re-fueling station (not shown). Prior to this UAV 311 leaving the array, a replacement UAV 311 is translated to the array 315 and positioned for substitution into the array 315 when the UAV 311 returns to the re-fueling station. A first portion of the object 317 is shown being fabricated in FIG. 29A, whereby the UAVs 311 are arranged by the controller to form a single array 315 of appropriate dimensions and containing appropriately configured UAVs 311 to fabricate the first portion geometry. A second portion of the object 317 is shown being fabricated in FIG. 29B, whereby the UAVs 311 are rearranged by the controller to form two appropriately configured arrays 315 to fabricate the second portion geometry. It will be appreciated that the arrangement and rearrangement of the UAVs 311 may occur substantially continuously throughout the fabrication process, depending on the object geometry. As described above with reference to FIG. 26, use of this embodiment of the apparatus 310 is also particularly useful in environments where it would be problematic to erect a crane or scaffold to enable lifting the array 281, for example, high-density urban environments having limited access, as the apparatus 310 can be conveniently transported to the environment and deployed to fabricate the object 317 with minimal supporting infrastructure necessary.

Figure 29:
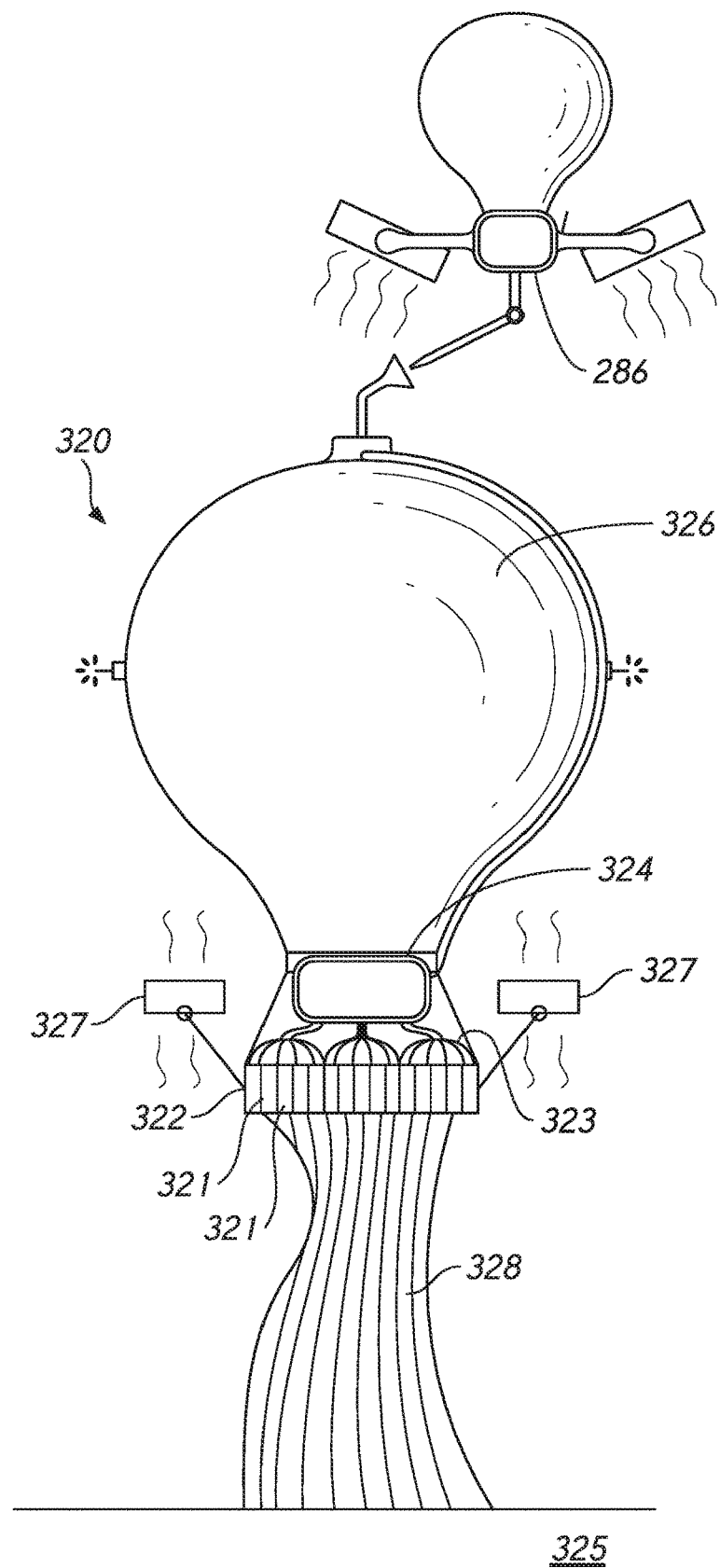
Figure 30:
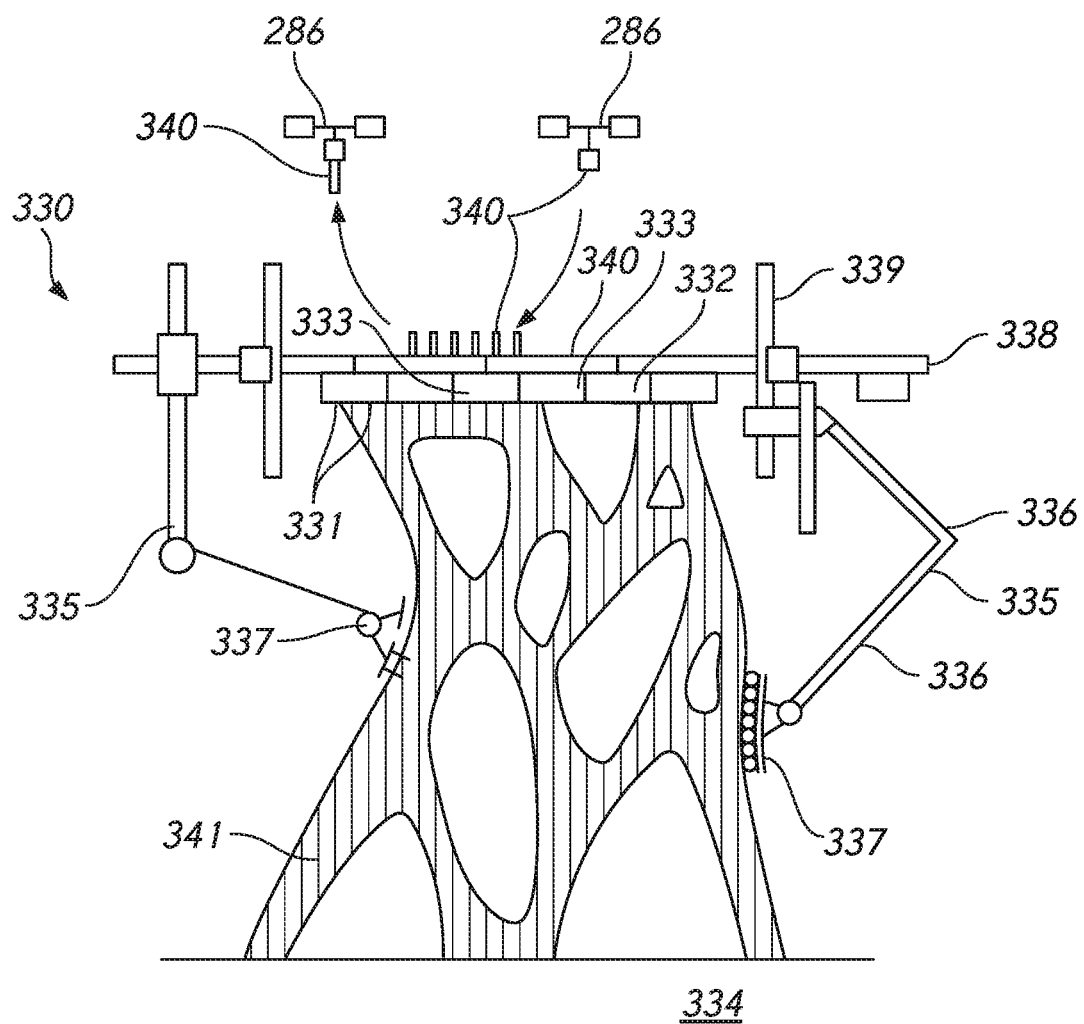
FIG. 30 is a side view of a further alternative apparatus having an array connected to a plurality of robotic arms configured to grip deposited material and arrange the array thereabove.

FIG. 29 shows an alternative apparatus 320 including a plurality of nozzles 321 arranged in an array 322, each of the nozzles 321 in communication with a supply of build material, in the embodiment shown in FIG. 30 via hoses 323 connected to a reservoir 324 containing the build material, and configured to expel a quantity of the build material therefrom. The array 322 is arranged relative to a substrate 325 by an array translation mechanism, in the form of a balloon 326 and rotor assemblies 327. The balloon 326 contains a volume of gas configured to be less dense than a surrounding environment, for example, by heating or due to composition of the gas. A lifting force provided by the balloon 326 is configured according to a weight of the array 322, reservoir 324, build material and rotor assemblies 327, and is appropriately specified, for example, by specifying dimensions of the balloon 326, to cause the array 322 to be elevated away from the substrate 325. The apparatus 320 typically also includes a supply of the gas (not shown), or a heating element (not shown) to heat ambient gas drawn into the balloon 326, to allow the volume of low density gas to be adjusted and therefore control elevation of the balloon 326. Each rotor assembly 327 includes a plurality of rotors coupled to a motor and rotatable about a common axis, and operation of the assemblies 327 controls a position of the array 322 relative to the substrate 325. For example, each rotor assembly 327 may be connected to the array 322 by a gimbal-type linkage, allowing rotation of the rotor assembly 327 relative to the array 322 to urge the array 322 in any direction relative to the substrate 325, to stabilise the array 322 and/or enhance accuracy of movement of the array 322. The apparatus 320 may further include one or more re-fueling vehicles 286, as described above, configured to refuel the reservoir 324. The apparatus further includes a controller (not shown) configured to control operation of the nozzles 321 and elevation of the array 322, for example by operating the rotor assemblies 327, responsive to data relating to the object geometry.

An object 328 is shown partially fabricated by the apparatus 320. The object 328 has been fabricated by initially arranging the array 322 adjacent the substrate 325, and then progressively moving the array 322 away from the substrate 325 and, typically simultaneously, operating at least some of the nozzles 321 to deposit portions of the build material in specific locations corresponding with the object 328 geometry. The array 322 is translated relative to the substrate by at least one of adjusting the volume of gas in the balloon 326, or properties of the gas in the balloon 326, and operating the rotor assemblies 327. For example, the balloon 326 may contain sufficient gas volume to elevate the array 322 a distance from the substrate 325 greater than a maximum height dimension of the object 328 and the rotor assemblies 327 are operated to provide thrust towards the substrate 325, therefore controlling elevation of the balloon 326 and array 322. Alternatively, the gas contained in the balloon 326 is progressively heated to increase elevation of the balloon 326 and array 322. In this scenario, the rotor assemblies 327 may be operated to stabilise the array 322, for example, due to the effect of winds.

FIG. 30 shows an alternative apparatus 330 including a plurality of nozzles 331 arranged in an array 332, each of the nozzles 331 in communication with a supply of build material, in the embodiment shown in FIG. 31 contained in one or more on-board reservoirs 340, and configured to expel a quantity of the build material therefrom. The array 332 typically comprises a plurality of modular array units 333 each housing a plurality of the nozzles 331 and typically being connectable to other like modular array units 333. The array 332 is arranged relative to a substrate 334 by an array translation mechanism, in the form of a plurality of robotic arms 335. Each robotic arm 335 typically includes a plurality of sections 336 which are movable and rotatable relative to each other, and also includes a gripping mechanism 337 at one end of the arm 335. The array 332 is typically connected to the arms 335 by a frame 338 and adjustment mechanism, such as a rack gear mechanism 339, to allow translation of the array 332 relative to the arms 335. The apparatus further includes a controller (not shown) configured to control operation of the nozzles 331 and elevation of the array 332 by operating the arms 335, grippers 337 and rack gear mechanisms 339, responsive to data relating to the object geometry. The apparatus 330 typically also includes one or more re-fueling vehicles 286, as described above, configured to refuel the one or more reservoirs 340, or transport a replacement reservoir 340 full of the build material to the array 322 and replace an empty reservoir 340 with the full reservoir 340.

An object 341 is shown partially fabricated by the apparatus 320. The object 326 has been fabricated by initially arranging the array 332 adjacent the substrate 334, and then progressively moving the array 322 away from the substrate 334 and, typically simultaneously, operating at least some of the nozzles 331 to deposit portions of the build material in specific locations corresponding with the object 341 geometry. The array 332 is translated relative to the substrate 334 by operating the arms 335 and gripping mechanisms 337. When a base portion of the object 341 is being fabricated, this typically involves arranging the gripping mechanisms 337 on the substrate 334 and supporting the array 332 thereabove with the arms 335 to define a separation distance between the array 332 and the substrate 334. Incremental adjustment of the separation distance may be achieved by operating the rack gear mechanism 339. Following fabrication of the base portion of the object 341, the gripping mechanisms 337 are typically urged against the object 341 and the arms 335 support the array 332 above the object 341, thereby allowing the apparatus 330 to climb the object 341 whilst it is being fabricated. To assist with this, the apparatus 330 typically has at least three arms 335 to allow a minimum of two arms 335 to support the array 332 whilst a third arm 335 is arranged in a more elevated portions relative to the two arms 335 to enable the apparatus 330 to climb further up the object 341. The gripping mechanisms 337 may also be configured to assist with the climbing action, for example, by including a deformable caterpillar track to enable rolling along surfaces of the object 341 whilst providing a frictional engagement.

Throughout this specification the word "comprise", or variations such as "comprises" or "comprising", will be understood to imply the inclusion of a stated element, integer or step, or group of elements, integers or steps, but not the exclusion of any other element, integer or step, or group of el36ements, integers or steps.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An apparatus for fabricating an object on a substrate, the apparatus comprising:
   a plurality of nozzles arranged in a grid array having a periphery defining a maximum cross-sectional area of the object, the array having the nozzles arranged according to the maximum cross-sectional area of the object, each nozzle being in communication with a supply of build material and each nozzle configured to expel a quantity of the build material therefrom;
   a translation mechanism configured to move at least one of the array and the substrate in a single direction to cause relative movement of the array and the substrate away from each other; and
   a controller configured to selectively operate each nozzle to deposit a portion of the build material, and operate the translation mechanism to space the array and the substrate apart, responsive to data relating to a geometry of the object,
   the controller being configured to selectively operate at least some of the nozzles simultaneously to deposit portions of the build material in specific locations corresponding with the object geometry, such that each operation of the at least some of the nozzles deposits the portions to cause simultaneous fabrication of an entire cross-section of the object, and
   the controller is further configured to continue operating the at least some of the nozzles, successively or concurrently with operating the translation mechanism to move the array and the substrate away from each other only in the single direction, to progressively deposit the portions until the portions form the object.

2. The apparatus according to claim 1, wherein the array translation mechanism includes a lifting device configured to elevate the array relative to the substrate.

3. The apparatus according to claim 2, wherein the lifting device includes one or more rotor assemblies configured to provide lift, and wherein operation of the one or more rotor assemblies elevates the array.

4. The apparatus according to claim 1, further including a framework erected relative to the substrate, and wherein the array translation mechanism includes a drive mechanism coupled to the array and the framework, and wherein operation of the drive mechanism moves the array relative to the framework.

5. The apparatus according to claim 1, further comprising a platform defining the substrate, and the translation mechanism is configured to move the platform away from the array.

6. The apparatus according to claim 1, wherein at least one of the nozzles is at least one of movable within the array and rotatable about at least one axis.

7. The apparatus according to claim 1, wherein the array is rotatable about at least one axis.

8. The apparatus according to claim 1, wherein each nozzle is configured as a modular unit connectable to other like nozzles, and wherein the array comprises the plurality of nozzles connected together.

9. The apparatus according to claim 1, including a supply of second build material, and wherein the plurality of nozzles includes first nozzles in communication with the build material and second nozzles in communication with the second build material and configured to selectively expel a quantity of the second build material therefrom, and wherein the controller is further configured to selectively operate each second nozzle to deposit a portion of the second build material responsive to the object geometry, thereby fabricating the object from the build material and the second build material.

10. The apparatus according to claim 1, wherein at least one of the nozzles defines an orifice for expelling the build material therethrough and further include an orifice adjustment mechanism configured to adjust a dimension of the orifice, and the controller is further configured to operate the orifice adjustment mechanism.

11. The apparatus according to claim 1, wherein the array is configured as a modular array connectable to other like arrays, and wherein the apparatus includes a plurality of the arrays connected together.

* * * * *